US012718432B2

(12) United States Patent
Zhang

(10) Patent No.: US 12,718,432 B2
(45) Date of Patent: Aug. 25, 2026

(54) METHOD AND ELECTRONIC DEVICE FOR DRAWING DATA OF A TARGET COMPONENT IN DIFFERENT FRAME RATE CYCLES

(71) Applicant: Huawei Technologies Co., Ltd., Shenzhen (CN)

(72) Inventor: Guyuan Zhang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 41 days.

(21) Appl. No.: 18/717,925

(22) PCT Filed: Nov. 24, 2022

(86) PCT No.: PCT/CN2022/134089
§ 371 (c)(1),
(2) Date: Jun. 7, 2024

(87) PCT Pub. No.: WO2023/103800
PCT Pub. Date: Jun. 15, 2023

(65) Prior Publication Data

US 2025/0061622 A1 Feb. 20, 2025

(30) Foreign Application Priority Data

Dec. 10, 2021 (CN) ......................... 202111509224.1

(51) Int. Cl.
*G06T 11/23* (2026.01)
*G06F 9/50* (2006.01)
*G09G 5/00* (2006.01)

(52) U.S. Cl.
CPC ............ *G06T 11/23* (2026.01); *G06F 9/5027* (2013.01); *G09G 5/001* (2013.01); *G09G 2340/0435* (2013.01); *G09G 2360/08* (2013.01)

(58) Field of Classification Search
CPC ....... Y02D 10/00; G06T 11/203; G06F 9/451; G06F 9/5027; G09G 5/001; G09G 5/12;
(Continued)

(56) References Cited

U.S. PATENT DOCUMENTS

| | | | | |
|---|---|---|---|---|
| 2014/0184611 A1* | 7/2014 | Wyatt | G09G 3/36 | 345/501 |
| 2015/0370458 A1* | 12/2015 | Chen | G06F 1/3215 | 715/765 |

FOREIGN PATENT DOCUMENTS

| | | |
|---|---|---|
| CN | 110708587 A | 1/2020 |
| CN | 113132526 A | 7/2021 |

(Continued)

*Primary Examiner* — Jacinta M Crawford
(74) *Attorney, Agent, or Firm* — Slater Matsil, LLP

(57) ABSTRACT

This application provides a drawing method and an electronic device. The method includes: refreshing a first image to a second image at a first time point, where a target component in the first image is different from a target component in the second image; and drawing, between the first time point and a second time point, a target component that needs to be refreshed and displayed at a third time point after the second time point, and generating drawing data. In this case, image refreshing may be performed at the third time point based on the drawing data, and a target component in an image obtained after refreshing is different from the target component in the second image.

20 Claims, 14 Drawing Sheets

(58) Field of Classification Search
CPC ................. G09G 5/18; G09G 2310/04; G09G 2340/0435; G09G 2350/00; G09G 2360/08
USPC .................................................. 345/501, 545
See application file for complete search history.

(56) References Cited

FOREIGN PATENT DOCUMENTS

| | | | |
|---|---|---|---|
| CN | 113554967 | A | 10/2021 |
| WO | 2020259623 | A1 | 12/2020 |

* cited by examiner

METHOD AND ELECTRONIC DEVICE FOR DRAWING DATA OF A TARGET COMPONENT IN DIFFERENT FRAME RATE CYCLES

CROSS-REFERENCE TO RELATED APPLICATIONS

This application is a National Stage of International Application No. PCT/CN2022/134089, filed on Nov. 24, 2022, which claims priority to Chinese Patent Application No. 202111509224.1, filed on Dec. 10, 2021. Both of the aforementioned applications are hereby incorporated by reference in their entireties.

TECHNICAL FIELD

Embodiments of this application relate to the field of terminal technologies, and in particular, to a drawing method and an electronic device.

BACKGROUND

With development of terminal technologies, more functions are configured in an electronic device, and display content also becomes richer. However, because a lightweight device (for example, a smartwatch) has a poor hardware condition and does not have a multi-task concurrent processing capability, it is difficult for the lightweight device to complete display of a complex interface including a plurality of components.

For example, for some interfaces that need to display a plurality of components including a simple component and a complex component, limited by the hardware condition, the lightweight device can perform rendering only after drawing logic of all components is executed, to display the plurality of components. However, because a graph drawing process of the complex component in combined drawing is time-consuming, it is very difficult to complete drawing of all components in one frame rate cycle. Consequently, drawing in a corresponding frame is abnormal and display cannot be performed, and finally frame freezing occurs in display of the lightweight device, affecting user experience.

SUMMARY

To resolve the foregoing technical problems, embodiments of this application provide a drawing method and an electronic device. According to the technical solutions provided in embodiments of this application, a complex component is drawn in a time period in which the component originally does not need to be drawn before the component is refreshed and displayed, to meet a requirement of a lightweight device in a complex display scenario.

To achieve the foregoing technical objective, embodiments of this application provide the following technical solutions.

According to a first aspect, a drawing method is provided, and is applied to an electronic device. The method includes: refreshing a first image to a second image at a first time point, where a target component in the second image is different from a target component in the first image; generating, between the first time point and a second time point, first drawing data of a target component that is to be displayed after refreshing to be performed at a third time point, and performing image refreshing for at least one time, where a target component in an image obtained after each time of refreshing is the same as the target component in the second image; and performing image refreshing at the third time point based on the first drawing data, where a target component in a third image obtained after refreshing is different from the target component in the second image.

In some embodiments, a time sequence of the first time point, the second time point, and the third time is that the first time point is before the second time point, and the second time point is before the third time point.

In this way, according to the drawing method provided in this embodiment of this application, frame freezing caused by a frame loss in a complex interface display process can be avoided through segment drawing, without a need to perform hardware reconstruction for a lightweight device, for example, without increasing a CPU processing speed or expanding a hardware acceleration processing module. This ensures a high frame rate display requirement of a user for a complex interface and improves user experience.

According to the first aspect, before the generating, between the first time point and a second time point, first drawing data of a target component that is to be displayed after refreshing to be performed at a third time point, the method further includes: determining, at the first time point, that the target component that is to be displayed after refreshing to be performed at the third time point is different from the target component in the second image; or determining, at the first time point, that the target component that is to be displayed after refreshing to be performed at the third time point at a preset time interval is different from the target component in the second image.

For example, the electronic device obtains parameter information of a target component at the first time point. For example, the parameter information includes a drawing parameter and a time parameter. For example, the electronic device learns, at the first time point based on the time parameter, that a time point for a next time of refreshing is the third time point, and may determine that the target component that is to be displayed after refreshing to be performed at the third time point is different from a target component displayed before refreshing. Therefore, it is determined that the target component needs to be drawn by segment. Alternatively, the electronic device determines, based on the time parameter, that a quantity of time units of an interval between every two times of refreshing of the target component is a fixed quantity greater than 0, and may determine that the target component needs to be drawn by segment, in other words, the target component is drawn by segment based on the quantity of time units of the interval.

In this way, the electronic device can determine, based on the obtained parameter information, whether the component needs to be drawn by segment, to determine a specific drawing manner of segment drawing. This effectively avoids frame freezing caused by a complex component in a frame rate cycle.

According to any one of the first aspect or the implementations of the first aspect, the generating, between the first time point and a second time point, first drawing data of a target component that is to be displayed after refreshing to be performed at a third time point includes: determining that a time interval between the first time point and the second time point is a first quantity of frame rate cycles, where there is one frame rate cycle between the second time point and the third time point, and performing, by the electronic device, image refreshing based on the frame rate cycle; equally dividing, based on the first quantity, to-be-drawn data of the target component that is to be displayed after refreshing to be performed at the third time point; and generating the first drawing data between the first time point and the second time point based on a division result.

For example, the electronic device refreshes a component A in a first frame and a fourth frame, and a component A after refreshing is different from the component A before refreshing. After determining that the component A needs to be drawn by segment, the electronic device determines that a current frame is the first frame, and is separated by three frames from the fourth frame for a next time of refreshing, and the three frames may be used to draw graph data of the component A by segment. Therefore, the electronic device may divide the graph data of the component A based on a preset rule, to determine graph data that needs to be drawn in each frame. For example, the electronic device divides the graph data of the component A into three parts, for example, A1, A2, and A3, based on time of the three frame of the first frame, a second frame, and a third frame. Division of the graph data of the component may be determined based on a data structure of the component. For example, a developer determines matrix information of the to-be-displayed component A, and equally divides a matrix corresponding to the component A, where A1, A2, and A3 each correspond to ⅓ of the matrix.

In this way, it is determined, based on a quantity of frame rate cycles of an interval between two times of refreshing, to draw the complex component by equally dividing the component. A data amount of each part of to-be-drawn component is small, to avoid frame freezing.

According to any one of the first aspect or the implementations of the first aspect, the first quantity is N, and N is an integer greater than or equal to 2; and the generating the first drawing data between the first time point and the second time point based on a division result includes: drawing, in each refreshing cycle between the first time point and the second time point, 1/N of the to-be-drawn data of the target component that is to be displayed after refreshing to be performed at the third time point, and generating the first drawing data.

For example, the electronic device completes drawing of graph data of a component B in the first frame, and then determines to draw A1. After drawing of A1 is completed, A1 is buffered in a buffer (a target storage area). In the second frame, after completing drawing of the graph data of the component B, a view system draws A2, and places drawn A2 in the buffer. In the third frame, after completing drawing of the graph data of the component B, the view system draws A3, and places drawn A3 in the buffer. Herein, A1, A2, and A3 each are ⅓ of the component A.

In this way, only a small quantity of graph data needs to be drawn in each frame rate cycle, to effectively avoid frame freezing.

According to any one of the first aspect or the implementations of the first aspect, the generating the first drawing data between the first time point and the second time point based on a division result includes: drawing, based on the division result in each frame rate cycle in a first frame rate cycle between the first time point and the second time point, the to-be-drawn data of the target component that is to be displayed after refreshing to be performed at the third time point; generating the first drawing data; and skipping drawing, in a remaining second frame rate cycle, the to-be-drawn data of the target component that is to be displayed after refreshing to be performed at the third time point, where usage of a central processing unit CPU in the first frame rate cycle is less than or equal to a first threshold, and usage of the CPU in the second frame rate cycle is greater than the first threshold.

For example, the electronic device equally divides the component A into three parts A1, A2, and A3 based on three frames in which the component A does not need to be refreshed. Original to-be-drawn graph data that needs to be drawn in the second frame includes the graph data of the component B and graph data of a component C. After the electronic device determines to draw the graph data of the component B and the graph data of the component C, the CPU is no longer idle (in other words, the usage is greater than the first threshold). For example, time consumed for drawing the graph data of the component B and the graph data of the component C is equal to duration of the frame rate cycle, or remaining time is insufficient for drawing A2. In this case, the electronic device determines to delay drawing of A2. Then, after completing drawing of the graph data of the component B and A3 in the third frame, the electronic device determines whether the CPU is idle (whether the usage is less than or equal to the first threshold). If the CPU is idle (in other words, the usage is less than or equal to the first threshold), the electronic device may draw A2 whose drawing is delayed. Alternatively, after drawing of the graph data of the component B and A3 is completed in the third frame, if it is determined that the CPU is not idle or the remaining time is insufficient for drawing A2, A2 may be delayed again, and A2 is not drawn until a time period in which the CPU is idle in a frame before a frame in which refreshing is performed or in a frame in which refreshing is performed. For example, A2 is drawn in the fourth frame and a layer of the component A is composed.

In this way, even if component division is completed in advance, drawing may be adjusted based on actual usage of the CPU, to avoid affecting drawing of another component and causing frame freezing.

According to any one of the first aspect or the implementations of the first aspect, (a+b) frame rate cycles are included between the first time point and the second time point, a and b are integers, and the generating, between the first time point and a second time point, first drawing data of a target component that is to be displayed after refreshing to be performed at a third time point includes: drawing, in a frame rate cycles between the first time point and the second time point, to-be-drawn data of the target component that is to be displayed after refreshing to be performed at the third time point; generating the first drawing data; and skipping drawing, in b frame rate cycles between the first time point and the second time point, to-be-drawn data of the target component that is to be displayed after refreshing to be performed at the third time point. Usage of a CPU in the a frame rate cycles is less than or equal to a first threshold, and usage of the CPU in the b frame rate cycles is greater than the first threshold; or drawing of the to-be-drawn data of the target component that is to be displayed after refreshing to be performed at the third time point is completed in the a frame rate cycles in which the usage of the CPU is less than or equal to the first threshold.

According to any one of the first aspect or the implementations of the first aspect, in a frame rate cycle other than a last frame rate cycle in the a frame rate cycles in a time sequence, after the first drawing data is generated, the usage of the CPU is greater than or equal to the first threshold.

For example, the electronic device determines that the component A is a complex graph, and determines, based on an obtained time parameter of a next time of refreshing of the component A, that the component A may be drawn by segment in the first frame, the second frame, and the third frame. In this case, after completing drawing of the graph data of the component B in the first frame, the electronic device determines that the CPU is idle (in other words, the usage is less than or equal to the first threshold), and may determine remaining time of the first frame as time used to draw some graph data in the graph data of the component A. The electronic device determines that graph data with a maximum data amount of A4 is drawn in the remaining time, and may divide A4 from the graph data of the component A, and complete drawing of A4 in the first frame. In other words, duration of the first frame is determined as longest drawing time, and the graph data is drawn in the longest drawing time. In this way, a frame loss is not caused. Alternatively, a longest drawing time threshold is set. The longest drawing time threshold is less than or equal to duration of the frame rate cycle. The electronic device draws the graph data based on the longest drawing time threshold. Then, in the second frame, the electronic device may still draw graph data based on the longest drawing time threshold. For example, if the electronic device determines remaining graph data (for example, A5) of the component A, there may be remaining time in the second frame after drawing is completed in the second frame, and the electronic device may no longer perform graph drawing in the second frame.

In other words, the electronic device may adaptively adjust, based on the duration of the frame rate cycle and the usage of the CPU, whether to draw the target component in a frame rate cycle between the first time point and the second time point, and a size of the first drawing data for drawing the target component. In this case, if the target component is drawn based on the longest drawing time, all frame rate cycles other than the last frame rate cycle in the a frame rate cycles in the time sequence and that are used for drawing the target component need to meet a requirement of the longest drawing time. In other words, usage of the CPU after drawing is greater than or equal to the first threshold. After the target component is drawn in the last frame rate cycle, the usage of the CPU may be greater than or equal to the first threshold or less than the first threshold.

In this way, the electronic device adaptively adjusts drawing of the complex component based on the usage of the CPU, to ensure drawing of the complex component and drawing of another component, and avoid frame freezing.

According to any one of the first aspect or the implementations of the first aspect, the first drawing data is all or some drawing data of the target component to be displayed after refreshing to be performed at the third time point.

According to any one of the first aspect or the implementations of the first aspect, the first drawing data is some drawing data of the target component to be displayed after refreshing to be performed at the third time point, and the method further includes: generating remaining second drawing data between the second time point and the third time point if a proportion of the first drawing data to all the drawing data of the target component to be displayed after refreshing to be performed at the third time point is greater than or equal to a second threshold; or discarding the first drawing data if the proportion of the first drawing data to all the drawing data of the target component to be displayed after refreshing to be performed at the third time point is less than the second threshold.

For example, the second threshold is, for example, a percentage threshold. For example, the second threshold is 80% of a data amount of the target component. The electronic device determines, in a frame corresponding to a refreshing occasion, that 90% of the target component is drawn, and may draw remaining 10% of data in the frame. For another example, the second threshold is 80% of a data amount of the target component. The electronic device determines, in a frame corresponding to a refreshing occasion, that only 30% of the target component is drawn, and may redraw the component in the frame. Therefore, display efficiency is improved while it is ensured that the target component is normally displayed.

According to any one of the first aspect or the implementations of the first aspect, after the generating, between the first time point and a second time point, first drawing data of a target component that is to be displayed after refreshing to be performed at a third time point, the method further includes: storing the first drawing data in a target storage area.

In some embodiments, the target storage area for storing segment drawing data is preconfigured, to ensure that execution of a segment drawing process does not conflict with drawing of another component.

According to a second aspect, an electronic device is provided. The electronic device includes a processor, a memory, and a computer program. The computer program is stored in the memory. When the computer program is executed by the processor, the electronic device is enabled to perform the following operations: refreshing a first image to a second image at a first time point, where a target component in the second image is different from a target component in the first image; generating, between the first time point and a second time point, first drawing data of a target component that is to be displayed after refreshing to be performed at a third time point, and performing image refreshing for at least one time, where a target component in an image obtained after each time of refreshing is the same as the target component in the second image; and performing image refreshing at the third time point based on the first drawing data, where a target component in a third image obtained after refreshing is different from the target component in the second image.

According to the second aspect, when the processor reads computer instructions from the memory, the electronic device is further enabled to perform the following operations: determining, at the first time point, that the target component that is to be displayed after refreshing to be performed at the third time point is different from the target component in the second image; or determining, at the first time point, that the target component that is to be displayed after refreshing to be performed at the third time point at a preset time interval is different from the target component in the second image.

According to any one of the second aspect or the implementations of the second aspect, the generating, between the first time point and a second time point, first drawing data of a target component that is to be displayed after refreshing to be performed at a third time point includes: determining that a time interval between the first time point and the second time point is a first quantity of frame rate cycles, where there is one frame rate cycle between the second time point and the third time point, and performing, by the electronic device, image refreshing based on the frame rate cycle; equally dividing, based on the first quantity, to-be-drawn data of the target component that is to be displayed after refreshing to be performed at the third time point; and generating the first drawing data between the first time point and the second time point based on a division result.

According to any one of the second aspect or the implementations of the second aspect, the first quantity is N, and N is an integer greater than or equal to 2; and the generating the first drawing data between the first time point and the second time point based on a division result includes:

drawing, in each refreshing cycle between the first time point and the second time point, 1/N of the to-be-drawn data of the target component that is to be displayed after refreshing to be performed at the third time point, and generating the first drawing data.

According to any one of the second aspect or the implementations of the second aspect, the generating the first drawing data between the first time point and the second time point based on a division result includes: drawing, based on the division result in each frame rate cycle in a first frame rate cycle between the first time point and the second time point, the to-be-drawn data of the target component that is to be displayed after refreshing to be performed at the third time point; generating the first drawing data; and skipping drawing, in a remaining second frame rate cycle, the to-be-drawn data of the target component that is to be displayed after refreshing to be performed at the third time point, where usage of a central processing unit CPU in the first frame rate cycle is less than or equal to a first threshold, and usage of the CPU in the second frame rate cycle is greater than the first threshold.

According to any one of the second aspect or the implementations of the second aspect, (a+b) frame rate cycles are included between the first time point and the second time point, a and b are integers, and the generating, between the first time point and a second time point, first drawing data of a target component that is to be displayed after refreshing to be performed at a third time point includes: drawing, in a frame rate cycles between the first time point and the second time point, to-be-drawn data of the target component that is to be displayed after refreshing to be performed at the third time point; generating the first drawing data; and skipping drawing, in b frame rate cycles between the first time point and the second time point, to-be-drawn data of the target component that is to be displayed after refreshing to be performed at the third time point. Usage of a CPU in the a frame rate cycles is less than or equal to a first threshold, and usage of the CPU in the b frame rate cycles is greater than the first threshold; or drawing of the to-be-drawn data of the target component that is to be displayed after refreshing to be performed at the third time point is completed in the a frame rate cycles in which the usage of the CPU is less than or equal to the first threshold.

According to any one of the second aspect or the implementations of the second aspect, in a frame rate cycle other than a last frame rate cycle in the a frame rate cycles in a time sequence, after the first drawing data is generated, the usage of the CPU is greater than or equal to the first threshold.

According to any one of the second aspect or the implementations of the second aspect, the first drawing data is all or some drawing data of the target component to be displayed after refreshing to be performed at the third time point.

According to any one of the second aspect or the implementations of the second aspect, when the processor reads the computer instructions from the memory, the electronic device is further enabled to perform the following operations: generating remaining second drawing data between the second time point and the third time point if a proportion of the first drawing data to all the drawing data of the target component to be displayed after refreshing to be performed at the third time point is greater than or equal to a second threshold; or discarding the first drawing data if the proportion of the first drawing data to all the drawing data of the target component to be displayed after refreshing to be performed at the third time point is less than the second threshold.

According to any one of the second aspect or the implementations of the second aspect, when the processor reads the computer instructions from the memory, the electronic device is further enabled to perform the following operation: storing the first drawing data in a target storage area.

For technical effects corresponding to any one of the second aspect or the implementations of the second aspect, refer to technical effects corresponding to any one of the first aspect or the implementations of the first aspect. Details are not described herein again.

According to a third aspect, an embodiment of this application provides an electronic device. The electronic device has a function of implementing the drawing method according to any one of the first aspect and the possible implementations of the first aspect. The function may be implemented by hardware, or may be implemented by hardware executing corresponding software. The hardware or software includes one or more modules corresponding to the foregoing function.

For technical effects corresponding to any one of the third aspect or the implementations of the third aspect, refer to technical effects corresponding to any one of the first aspect or the implementations of the first aspect. Details are not described herein again.

According to a fourth aspect, a computer-readable storage medium is provided. The computer-readable storage medium stores a computer program (which may also be referred to as instructions or code). When the computer program is executed by an electronic device, the electronic device is enabled to perform the method according to any one of the first aspect or the implementations of the first aspect.

For technical effects corresponding to any one of the fourth aspect or the implementations of the fourth aspect, refer to technical effects corresponding to any one of the first aspect or the implementations of the first aspect. Details are not described herein again.

According to a fifth aspect, an embodiment of this application provides a computer program product. When the computer program product is run on an electronic device, the electronic device is enabled to perform the method according to any one of the first aspect or the implementations of the first aspect.

For technical effects corresponding to any one of the fifth aspect or the implementations of the fifth aspect, refer to technical effects corresponding to any one of the first aspect or the implementations of the first aspect. Details are not described herein again.

According to a sixth aspect, an embodiment of this application provides a circuit system. The circuit system includes a processing circuit, and the processing circuit is configured to perform the method according to any one of the first aspect or the implementations of the first aspect.

For technical effects corresponding to any one of the sixth aspect or the implementations of the sixth aspect, refer to technical effects corresponding to any one of the first aspect or the implementations of the first aspect. Details are not described herein again.

According to a seventh aspect, an embodiment of this application provides a chip system, including at least one processor and at least one interface circuit. The at least one interface circuit is configured to: perform a transceiver function, and send instructions to the at least one processor. When the at least one processor executes the instructions, the at least one processor performs the method according to any one of the first aspect or the implementations of the first aspect.

For technical effects corresponding to any one of the seventh aspect or the implementations of the seventh aspect, refer to technical effects corresponding to any one of the first aspect or the implementations of the first aspect. Details are not described herein again.

DETAILED DESCRIPTION OF ILLUSTRATIVE EMBODIMENTS

Figure 1:
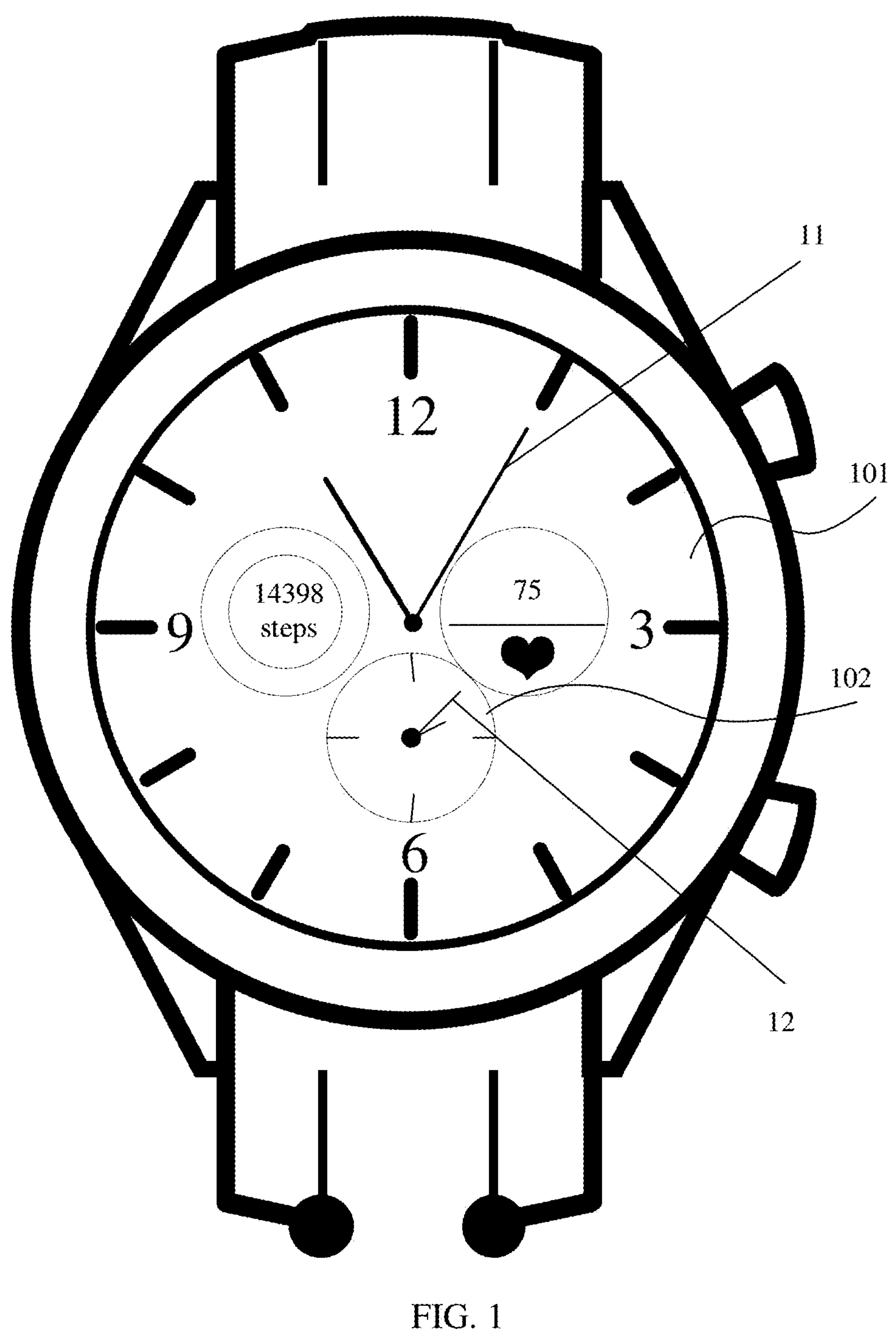
FIG. 1 is a diagram of an interface according to an embodiment of this application.

The following describes technical solutions in embodiments of this application with reference to accompanying drawings in embodiments of this application. In the descriptions of embodiments of this application, terms used in the following embodiments are merely intended for a purpose of describing specific embodiments, but are not intended to limit this application. As used in the specification and appended claims of this application, singular expressions "one", "a", "the foregoing", "the", and "the one" are also intended to include expressions such as "one or more", unless the contrary is clearly indicated in the context. It should be further understood that in the following embodiments of this application, "at least one" and "one or more" mean one or at least two (including two).

Reference to "one embodiment" or "some embodiments" described in this specification means that a specific characteristic, structure, or feature described in combination with this embodiment is included in one or more embodiments of this application. Therefore, statements "in one embodiment", "in some embodiments", "in some other embodiments", "in other embodiments", and the like in the differences in this specification do not necessarily mean the same embodiment, but mean "one or more but not all embodiments", unless otherwise specially emphasized in other ways. Terms "include", "comprise", "have", and variations thereof all mean "including but not limited to", unless otherwise specified. A term "connection" includes a direct connection and an indirect connection, unless otherwise specified. "First" and "second" are merely intended for a purpose of description, and shall not be understood as an indication or implication of relative importance or implicit indication of a quantity of indicated technical features.

In embodiments of this application, the word such as "example" or "for example" is used to represent giving an example, an illustration, or a description. Any embodiment or design solution described as an "example" or "for example" in embodiments of this application should not be explained as being more preferred or having more advantages than another embodiment or design solution. Exactly, use of the word such as "example" or "for example" is intended to present a related concept in a specific manner.

In some scenarios, as an electronic device has richer functions, the electronic device can display more animation effects. For example, a smartwatch shown in FIG. 1 may be configured with a plurality of functions such as a timing function, a heart rate monitoring function, and a step counting function. In this case, the smartwatch can display a dial plate 101 indicating a time point, and can further display a plurality of sub-dial plates on the dial plate, for example, a stopwatch dial plate 102, a dial plate used to display a heart rate, and a dial plate used to display a quantity of steps. A display location of a minute hand 11 displayed on the dial plate 101 needs to change once every minute, and a display location of a pointer 12 displayed on the stopwatch dial plate 102 needs to change once every second. In this case, in a frame, the smartwatch needs to simultaneously display the minute hand 11 and the pointer 12 after display locations are changed. In other words, the smartwatch needs to draw a plurality of components in the frame.

However, for a lightweight device such as the smartwatch, because a hardware specification of the lightweight device is low, the lightweight device has a poor computing and processing capability, and does not have a multi-process and multi-task concurrent processing capability. A graph drawing and display process of the lightweight device usually depends on a software drawing algorithm, and graphs are drawn in series. For a complex interface including a plurality of graphs, it is difficult to meet a display frame rate requirement of the electronic device by performing drawing in series, and frame freezing occurs. In other words, required duration in which the lightweight device performs drawing, rendering, and composition of a layer cannot meet a single-frame rendering requirement (for example, the required duration is greater than or equal to one frame rate cycle).

For example, if some electronic devices are currently provided with a display whose refresh rate per second is 60 hertz (Hz), a corresponding frame rate cycle is $T=1/60=0.01667$ seconds(s)=16.667 milliseconds (ms). Correspondingly, the lightweight device needs to complete drawing and rendering of a corresponding graph within 16.667 ms, so that a display requirement of a corresponding frame can be met after refreshing. As shown in FIG. 1, if a time point changes from 11:05 to 11:06, the minute hand 11 needs to be redrawn based on a display angle of the minute hand 11 in a frame in which refreshing is performed to change to 11:06. If the pointer 12 also needs to refresh a display location in the frame, the smartwatch needs to draw the minute hand 11 and the pointer 12 in series in the frame rate cycle. If drawing cannot be completed, frame freezing occurs.

Figure 2A:
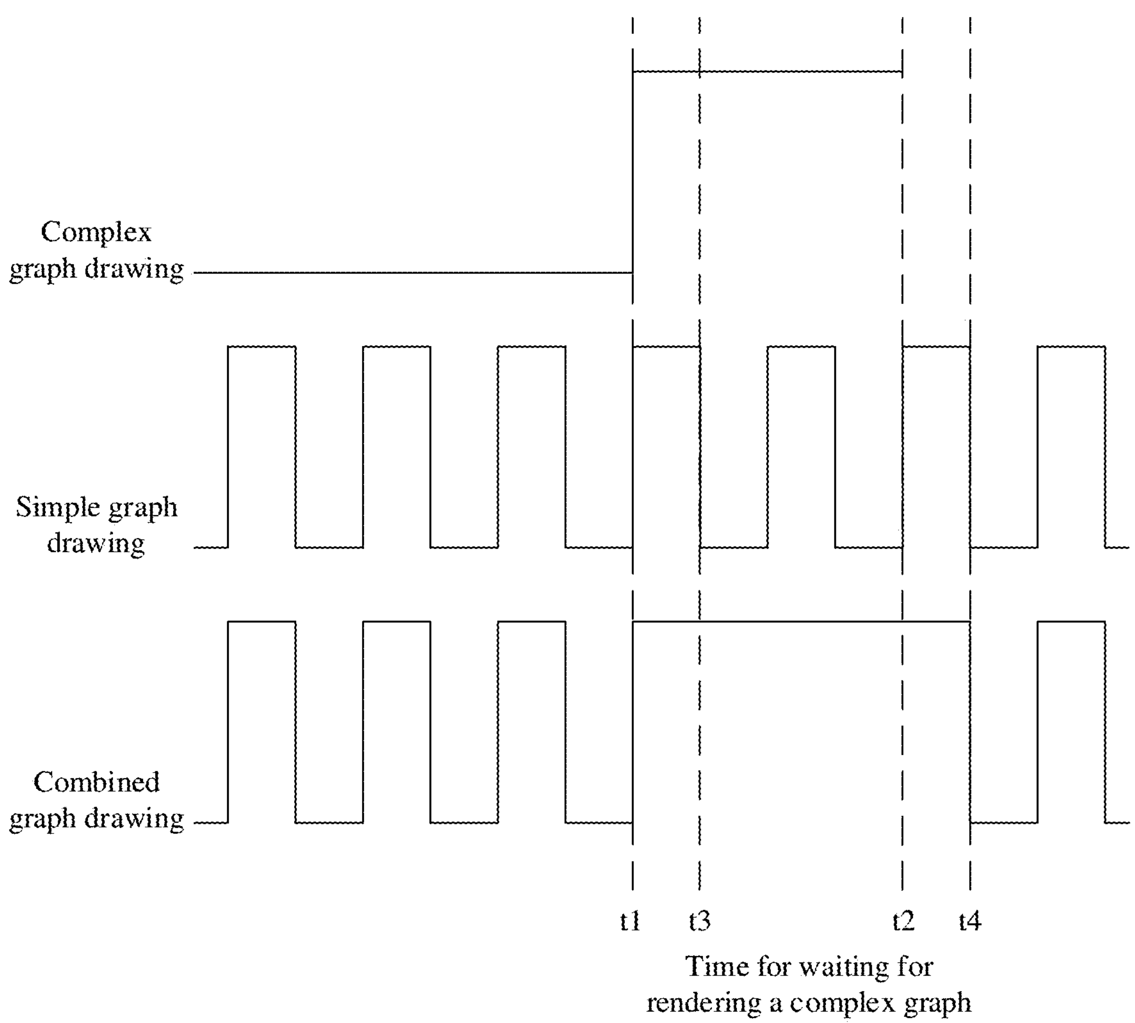
FIG. 2A is a diagram 1 of a graph drawing scenario according to an embodiment of this application.

For example, as shown in FIG. 2A, if time required for separately drawing a complex graph (for example, the minute hand 11 shown in FIG. 1) is (t1-t2), and time required for separately drawing a simple graph (for example, the pointer 12 shown in FIG. 1) is (t1-t3), and if display locations of components corresponding to a complex graph and a simple graph in a frame change, both the complex graph and the simple graph need to be redrawn. For a waveform diagram corresponding to combined graph drawing shown in FIG. 2A, a complex graph is drawn first, and required time is (t1-t2); and then a simple graph is drawn, and required time is (t2-t4). Therefore, if the frame of image needs to be displayed, required time is (t1-t4). If the frame rate cycle is (t1-t2), drawing duration of the frame exceeds a frame rate cycle requirement, and frame freezing occurs.

Figure 2B:
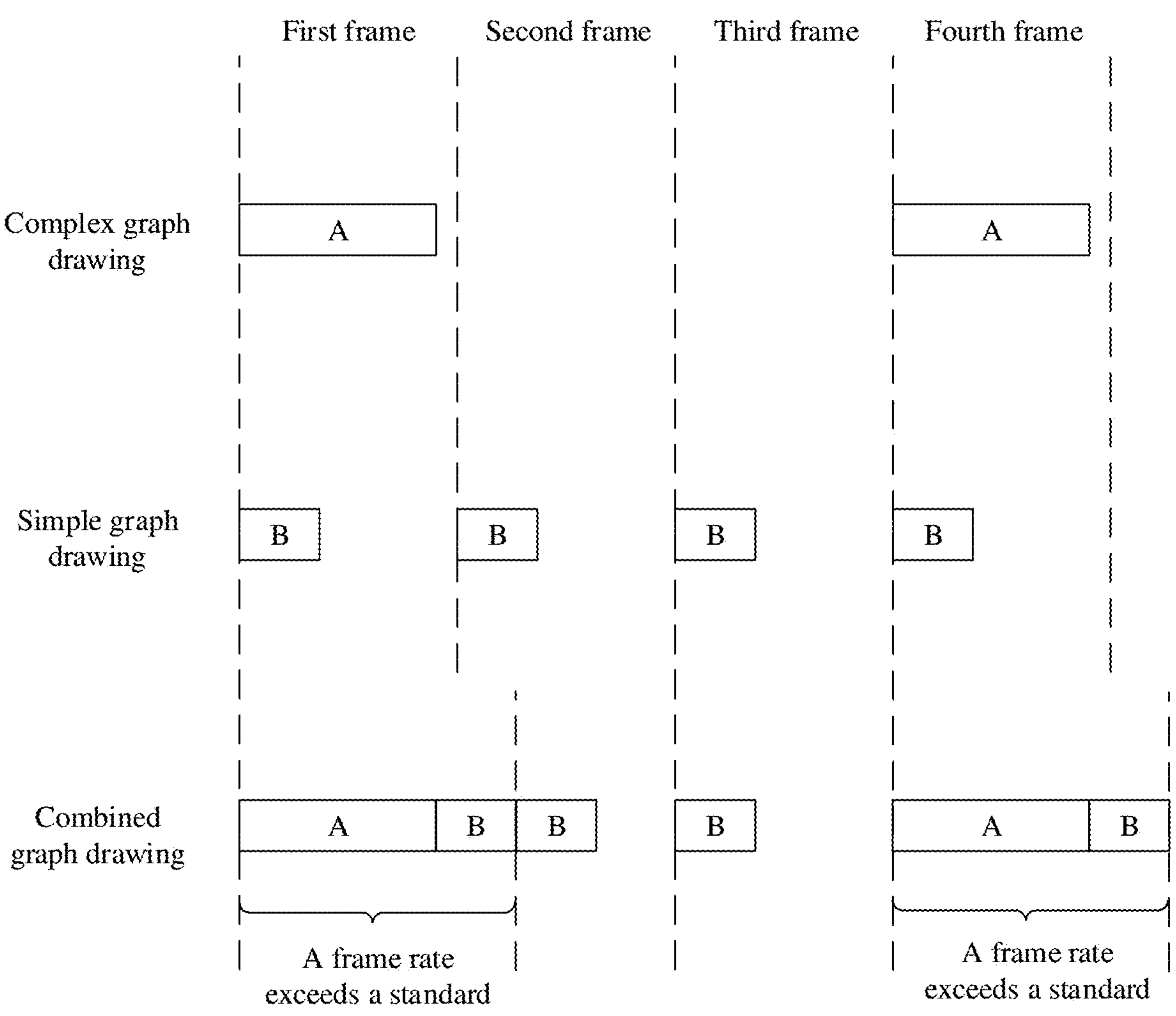
FIG. 2B is a diagram 2 of a graph drawing scenario according to an embodiment of this application.

For example, corresponding to FIG. 2A, as shown in FIG. 2B, if a component A is a complex graph, a display parameter needs to be refreshed once every two frames (for example, drawing, refreshing, and display are performed in a first frame and a fourth frame); and if a component B is a simple graph, a display parameter needs to be refreshed once every frame (for example, drawing, refreshing, and display are performed in each frame in the first frame to the fourth frame). In this case, the component A and the component B can be sent to the display for display only after serial drawing, rendering, and composition of the two components are completed in both the first frame and the fourth frame. Due to a hardware processing capability of the lightweight device, a frame loss may occur, and display frame freezing is caused. For example, drawing of the component A and the component B cannot be completed in the first frame and the fourth frame. Consequently, refreshing and display cannot be performed in the first frame or the fourth frame, and frame freezing occurs due to a frame loss.

Based on this, an embodiment of this application provides a drawing method. An electronic device may draw a graph by segment based on graph drawing parameter information and a display time point without depending on optimization of hardware performance, to avoid a frame loss, provide a user with smooth display of the complex interface, and improve user experience.

Figure 3:
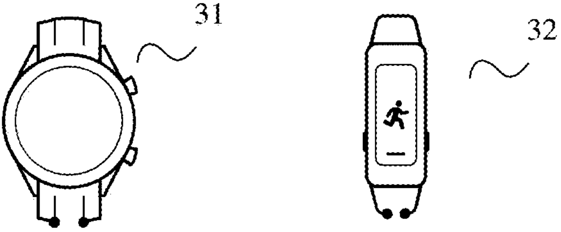
FIG. 3 is a diagram of a form of an electronic device according to an embodiment of this application.

The method provided in this embodiment of this application may be applied to an electronic device 100. For example, as shown in FIG. 3, the electronic device 100 may be specifically a terminal device having a display function, for example, a wearable device (for example, a smartwatch 11 or a smart band 12), a large-screen display device, a mobile phone 22, a notebook computer, a tablet, a vehicle-mounted device, an ultra-mobile personal computer (ultra-mobile personal computer, UMPC), a netbook, a personal digital assistant (personal digital assistant, PDA), or an artificial intelligence (artificial intelligence) device. An operating system installed on the electronic device 100 includes but is not limited to iOS®, Android®, Harmony®, Windows®, Linux®, or another operating system. Alternatively, the electronic device 100 may be installed with no operating system. A specific type of the electronic device 100, whether an operating system is installed, and an installed operating system are not limited in this application. Optionally, the electronic device 100 is a lightweight device.

The drawing method provided in this embodiment of this application may be performed by an apparatus for generating an image frame. The apparatus for generating an image frame may be any one of the foregoing electronic devices 100. Alternatively, the apparatus for generating an image frame may be a central processing unit (central processing unit, CPU) of the electronic device 100, or a graphics module (for example, a view system) configured to perform the drawing method in the electronic device 100. In this embodiment of this application, an example in which the electronic device 100 performs the drawing method is used to describe the drawing method provided in this embodiment of this application.

Figure 4:
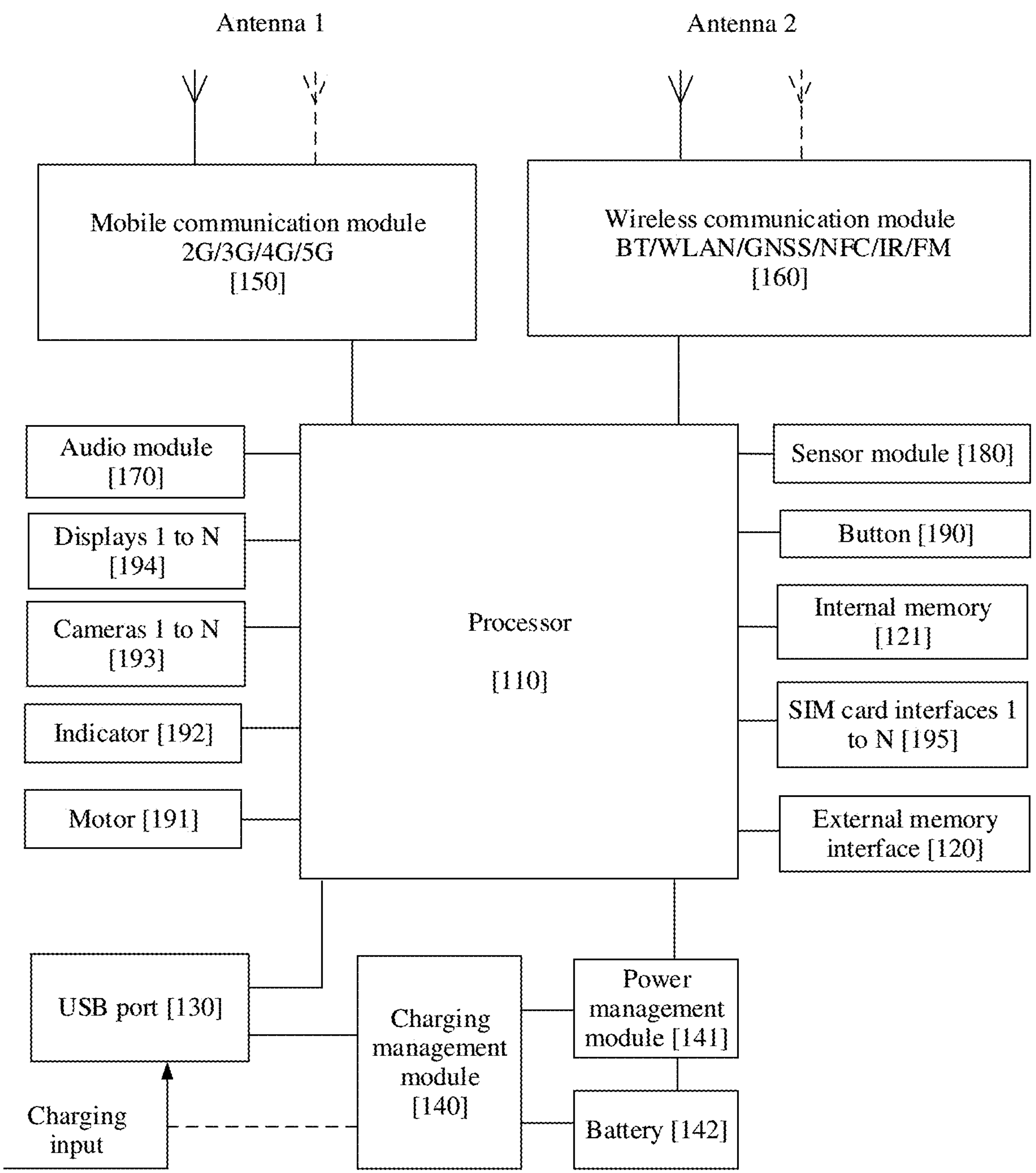
FIG. 4 is a diagram of a hardware structure of an electronic device according to an embodiment of this application.

For example, FIG. 4 is a diagram of a structure of an electronic device 100.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a sensor module 180, a button 190, a motor 191, an indicator 192, a camera 193, a display 194, and a subscriber identification module (subscriber identification module, SIM) card interface 195.

It may be understood that the structure shown in this embodiment of this application does not constitute a specific limitation on the electronic device 100. In some other embodiments of this application, the electronic device 100 may include more or fewer components than those shown in the figure, some components may be combined, or some components may be divided, or different component arrangements may be used. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data that is just used or repeatedly used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) port, and/or the like.

The I2C interface is a bidirectional synchronization serial bus, and includes one serial data line (serial data line, SDA) and one serial clock line (serial clock line, SCL). In some embodiments, the processor 110 may include a plurality of groups of I2C buses. The processor 110 may be separately coupled to a touch sensor, a charger, a flash, the camera 193, and the like by using different I2C bus interfaces. For example, the processor 110 may be coupled to the touch sensor through the I2C interface, so that the processor 110 communicates with the touch sensor through the I2C bus interface, to implement a touch function of the electronic device 100.

The MIPI interface may be configured to connect the processor 110 and peripheral devices such as the display 194 and the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The USB port 130 is an interface that conforms to a USB standard specification, and may be specifically a mini USB port, a micro USB port, a USB Type C port, or the like. The USB port 130 may be configured to be connected to the charger to charge the electronic device 100, or may be configured to transmit data between the electronic device 100 and a peripheral device, or may be configured to be connected to a headset, to play audio by using the headset. The interface may be further configured to be connected to another electronic device, for example, an AR device.

It may be understood that an interface connection relationship between the modules shown in this embodiment of this application is merely an example for description, and constitutes no limitation on the structure of the electronic device 100. In some other embodiments of this application, different interface connection manners in the foregoing embodiments or a combination of a plurality of interface connection manners may alternatively be used for the electronic device 100.

The charging management module 140 is configured to receive a charging input from the charger. The charger may be a wireless charger or a wired charger. The charging management module 140 may further supply power to the electronic device by using the power management module 141 while charging the battery 142.

The power management module 141 is configured to be connected to the battery 142, the charging management module 140, and the processor 110. The power management module 141 receives an input of the battery 142 and/or the charging management module 140, and supplies power to the processor 110, the internal memory 121, the display 194, the camera 193, the wireless communication module 160, and the like.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is used in the electronic device 100 and that includes 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 may be disposed in a same device as at least some modules in the processor 110.

The wireless communication module 160 may provide a wireless communication solution that is used in the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, and execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The sensor module 180 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

The display 194 in this embodiment of this application may be a touchscreen. In other words, the touch sensor is integrated in the display 194. The touch sensor may also be referred to as a "touch panel". To be specific, the display 194 may include a display panel and a touch panel. The touch sensor and the display 194 form a touchscreen. The touch sensor is configured to detect a touch operation performed on or near the touch sensor. After the touch sensor detects the touch operation, a driver (for example, a TP driver) at a kernel layer may transfer the touch operation to an upper layer, to determine a touch event type. A visual output related to the touch operation may be provided on the display 194. In some other embodiments, the touch sensor may be alternatively disposed on a surface of the electronic device 100, and is at a location different from that of the display 194.

For example, when the electronic device 100 determines that data (for example, display location information) of a refreshed component changes, the component needs to be redrawn, so that display of the refreshed component satisfies a requirement.

For example, after refreshing, the electronic device 100 can obtain a drawing parameter and a time parameter that correspond to a display location after a next time of refreshing. In this case, the electronic device 100 may divide data (which may be determined based on the drawing parameter) of a to-be-drawn component based on the time parameter, and perform drawing by segment. During a next time of refreshing, it can be ensured that drawing, rendering, and composition of all components are completed in the frame rate cycle, to avoid frame freezing.

For another example, after the electronic device 100 detects, by using the touch sensor, the touch operation performed by the user on the display 194, a location of a control displayed on the display 194 may be triggered to change. In this case, when an image of a subsequent frame is displayed, layer data needs to be redrawn. Similarly, the electronic device 100 may obtain a drawing parameter and a time parameter that correspond to a next time of refreshing, to perform drawing by segment.

The electronic device 100 may implement a photographing function through the ISP, the camera 193, the video codec, the GPU, the display 194, the application processor, and the like.

The camera 193 is configured to capture a static image or a video. An optical image of an object is generated through the lens, and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The external memory interface 120 may be configured to be connected to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (for example, audio data or an address book) created in a process of using the electronic device 100, and the like. The processor 110 runs the instructions stored in the internal memory 121, and/or instructions stored in memory disposed in the processor, to execute various function applications and data processing of the electronic device 100.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some functional modules in the audio module 170 are disposed in the processor 110. The electronic device 100 may implement an audio function, for example, music playing or recording, by using the audio module 170 and the application processor, and the like. The audio module may include a speaker, a receiver, a microphone, and a headset jack.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing or audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may alternatively be customized.

The indicator 192 may be an indicator light, and may be configured to indicate a charging status and a power change, or may be configured to indicate a message, a missed call, a notification, and the like.

The SIM card interface 195 is configured to be connected to an SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1.

A layered architecture, an event-driven architecture, a microcore architecture, a microservice architecture, or a cloud architecture may be used for a software system of the electronic device 100. In this embodiment of this application, an Android system with a layered architecture is used as an example to describe a software structure of the electronic device 100.

Figure 5:
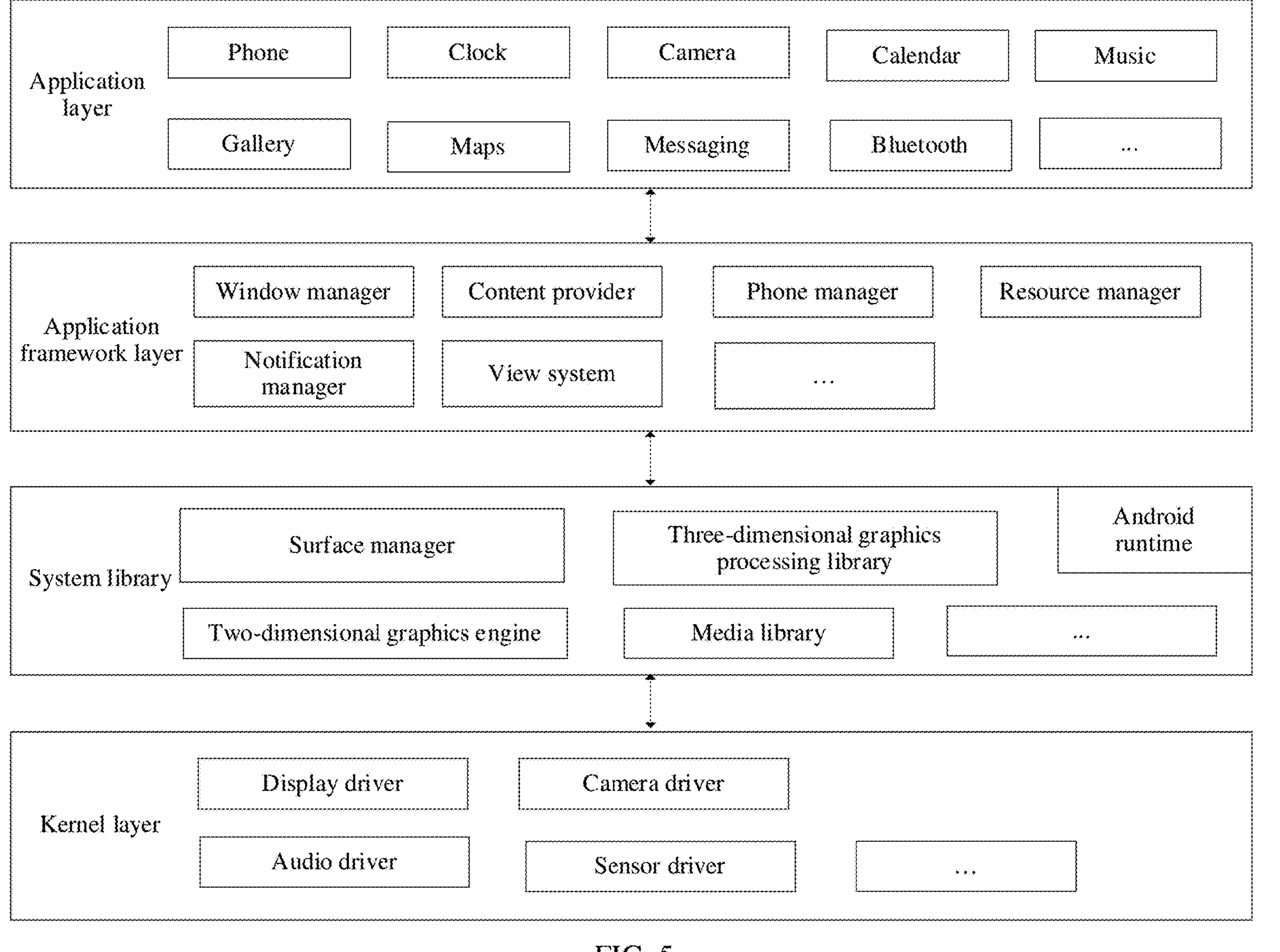
FIG. 5 is a block diagram of a software structure of an electronic device according to an embodiment of this application.

FIG. 5 is a block diagram of a software structure of an electronic device 100 according to an embodiment of this application.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 5, the application packages may include applications such as Phone, Clock, Camera, Calendar, Music, Gallery, Maps, Messaging, and Bluetooth.

In some embodiments, a developer preconfigures a component drawing parameter and a time parameter in an application development package. For example, in a scenario shown in FIG. 1, a developer preconfigures, in a clock application development package, a drawing parameter and a time parameter that correspond to refreshing a display location by the minute hand 11 every minute, for example, including a rotation center point, a rotation angle, and a time parameter of a next time of rendering.

The application framework layer provides an application programming interface (application programming interface, API) and a programming framework for the applications at the application layer. The application framework layer includes some predefined functions.

As shown in FIG. 5, the application framework layer may include a window manager, a content provider, a view system, a resource manager, a notification manager, and the like.

The window manager is configured to manage a window program. The window manager may obtain a size of the display, determine whether there is a status bar, perform screen locking, take a screenshot, and the like.

An activity manager is configured to manage an activity, and is responsible for work such as startup, switching, and scheduling of each component in the system, and management and scheduling of an application.

The content provider is configured to: store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

In some embodiments, the view system obtains a drawing parameter and a time parameter of a component by using an API, to complete drawing, rendering, and composition of a layer of a component.

The resource manager provides various resources for an application such as a localized character string, an icon, a picture, a layout file, and a video file.

The notification manager enables the application to display notification information in the status bar, may be configured to convey a notification-type message, and may automatically disappear after a short pause without a need to interact with a user.

The Android runtime includes a kernel library and a virtual machine. The Android runtime is responsible for scheduling and managing an Android system.

The kernel library includes two parts: a function that needs to be invoked in java language and a kernel library of Android.

The application layer and the application framework layer run on the virtual machine. The virtual machine executes java files of the application layer and the application framework layer as binary files. The virtual machine is configured to perform functions such as object lifecycle management, stack management, thread management, security and abnormality management, and garbage collection.

The system library may include a plurality of functional modules such as a surface manager (surface manager), a media library (Media Libraries), a three-dimensional graphics processing library (for example, OpenGL ES), and a two-dimensional graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video encoding formats such as MPEG-4, H.264, MP3, AAC, AMR, JPG, and PNG.

The three-dimensional graphics processing library is configured to implement three-dimensional graphics drawing, image rendering, composition, layer processing, and the like.

The two-dimensional graphics engine is a drawing engine for 2D drawing, and common graphics engines include, for example, Vulkan and Canvas.

The kernel layer is a layer between hardware and software. The kernel layer includes at least a display driver, a camera driver, an audio driver, and a sensor driver.

In the following embodiments, an example in which the electronic device 100 is a lightweight electronic device is used to describe the drawing method provided in embodiments of this application.

In some embodiments, a screen refresh rate of a display of an electronic device may be any value such as 30 Hz, 40 Hz, 60 Hz, 70 Hz, 75 Hz, 80 Hz, or 144 Hz. The electronic device refreshes and displays an image frame based on a frame rate cycle corresponding to the screen refresh rate. That the screen refresh rate is 60 Hz is used as an example. 60 Hz means that 60 image frames continuously appear in one second. The frame rate cycle is T=1/60=0.01667 seconds (s)=16.667 milliseconds (ms). The electronic device needs to complete drawing (in other words, drawing and rendering) of one image frame in one frame rate cycle.

It should be noted that the electronic device may support a plurality of different screen refresh rates. For example, if a maximum screen refresh rate supported by the electronic device is 80 Hz, the electronic device may support a screen refresh rate of 80 Hz, 60 Hz, 40 Hz, or the like. The screen refresh rate in embodiments of this application is a screen refresh rate currently used by the electronic device. In other words, the frame rate cycle T is a reciprocal of the screen refresh rate currently used by the electronic device.

In some embodiments, after a user interface (user interface, UI) event occurs on the electronic device or an operation performed by a user on a display picture (for example, a touch operation or a voice operation performed by the user on the display) is detected, the electronic device is triggered to draw one or more layers, render the one or more layers, perform layer composition on the one or more drawn layers (in other words, the rendered one or more layers) to obtain an image frame, and refresh and display, on the display, an image frame obtained through composition.

The UI event may be automatically triggered by the electronic device. For example, the UI event may be triggered when a foreground application of the electronic device automatically switches a picture. The foreground application is an application corresponding to an interface currently displayed on the display of the electronic device. For example, in a scenario shown in FIG. 1, a Clock application is a foreground application currently displayed by a smartwatch, and a display picture of a minute hand 11 is automatically switched every minute. In other words, the smartwatch refreshes and displays the display picture of the minute hand 11 at an interval of 1 minute.

In some embodiments, after detecting a drawing triggering event, the electronic device needs to create a control tree (view tree) corresponding to a to-be-drawn graph (for example, including a control and a layout). The control tree is used to represent a control and a layout that are organized in a tree structure. Specifically, in a process of creating the control tree, a root view (root view) is determined, and then a setContentView( ) method is invoked to complete creation of another node on the root view. Then, in a graph drawing process, the electronic device executes the drawing process from a root node (in other words, the root view) based on a node relationship included in the control tree.

For example, in the scenario shown in FIG. 1, in the control tree created by the electronic device, a background of an entire dial plate may be set as a root node. Then, a background of each sub-dial plate that needs to be displayed on the dial plate is set as a child node of the root node (in other words, a parent-child node relationship is set), and a sibling node relationship is set between the backgrounds of the sub-dial plates. Node relationships between controls and layouts on the dial plate are sequentially set, and the control tree is created, so that drawing of the dial plate is completed based on the control tree.

In some embodiments, as described above, the electronic device supports different screen refresh rates, and completes drawing (in other words, drawing and rendering) of the image frame based on a frame rate cycle corresponding to a currently used screen refresh rate, so that the image frame can be smoothly displayed after the display is refreshed.

In some scenarios, if graph data included in a to-be-displayed image frame does not change compared with graph data included in a previous image frame, graph data may not need to be redrawn. The graph data includes, for example, control data and layout data of a control. Optionally, if a control tree 1 corresponding to a to-be-displayed image frame is compared with a control tree 2 corresponding to a previous image frame, and it is determined that some graph data changes, graph data of a changed part may be drawn, and graph data of an unchanged part may not be drawn.

For example, in the scenario shown in FIG. 1, the electronic device displays a dial plate 101, and a time point that is refreshed and displayed on the dial plate 101 for a first time at a moment is 11:05. In this case, a display location of the minute hand 11 does not change in subsequent 59 seconds. For another example, a home screen of the electronic device displays application icons, and the user touches and holds one application icon in the application icons and drags the application icon to a blank display area for display. In a process of dragging the application icon, a location and display content of another application icon do not change. Therefore, the electronic device may no longer redraw an unchanged component in a neighboring image frame, to reduce power consumption of the electronic device.

In some other scenarios, when a neighboring image frame changes, the electronic device needs to redraw corresponding graph data, to display a changed image frame. Because some lightweight devices do not have a multi-task concurrent processing capability, if there is a large amount of changed graph data in a neighboring image frame or there is a to-be-drawn component with a large amount of graph data, the electronic device performs drawing of all pieces of changed graph data in series, and consumed time exceeds the frame rate cycle. Consequently, a frame loss occurs, and display of the image frame is affected.

Therefore, for some components for which graph data of a changed image frame can be determined, a developer may preconfigure, in an application package, a drawing parameter and a time parameter that correspond to a moment at which the component is refreshed and changes. Optionally, the time parameter is time parameter information of a next time of refreshing and changing (for example, a neighboring image frame changes after an image frame is refreshed). In this case, after obtaining a drawing parameter and a time parameter that correspond to the next time of refreshing and changing, the electronic device may determine a time point of a next time of refreshing based on the time parameter, and draw a component by segment based on the drawing parameter before the time point of the next time of refreshing. In this case, when the image frame needs to be refreshed, the drawn graph data may be directly obtained, and all parts of graph data are composed to generate complete graph data. Based on the final complete graph data, rendering of the graph data may be completed by consuming a small amount of time, and the frame rate cycle is not exceeded, to ensure display smoothness.

For example, in the scenario shown in FIG. 1, when the electronic device refreshes the display at 11:05, the electronic device can obtain a drawing parameter of current display of the minute hand 11, and can obtain a drawing parameter and a time parameter of a next time of refreshing and display of the minute hand 11. For example, time parameter information of the next time of refreshing is one minute (in other words, 60 seconds) later, the drawing parameter is information such as a rotation center point and a rotation angle that are of the minute hand 11 and that correspond to 11:06 displayed on the dial plate. If the screen refresh rate of the electronic device is 60 Hz, the frame rate cycle is T=1/60=0.01667 seconds(s)=16.667 milliseconds (ms). In other words, one second includes 60 frame rate cycles, and there are 60*60=360 frame rate cycles before the next time of refreshing. The electronic device needs to complete drawing, rendering, and composition of the minute hand 11 in the 360 frame rate cycles, so that normal display of the minute hand 11 can be ensured, to avoid a frame loss and display frame freezing caused when serial drawing of a plurality of components (for example, the minute hand 11 and a pointer 12) is completed in a frame rate cycle corresponding to a frame in which refreshing is performed.

The following describes a segment drawing implementation by using an example in which a component A and a component B are drawn, complex graph drawing is performed for the component A, and simple graph drawing is performed for the component B.

It should be noted that division into a complex graph and a simple graph may be determined by the developer based on an empirical value, an experimental value, or the like. For example, for a component corresponding to some functions, each frame of graph data is different, is redrawn, and may be designed as a simple graph whose drawing consumes a short period of time. For another example, for a component corresponding to some functions, if graph data changes at an interval of a specific quantity of frames, the component may be designed as a complex graph whose drawing is time-consuming, and is cyclically drawn.

Figure 6A:
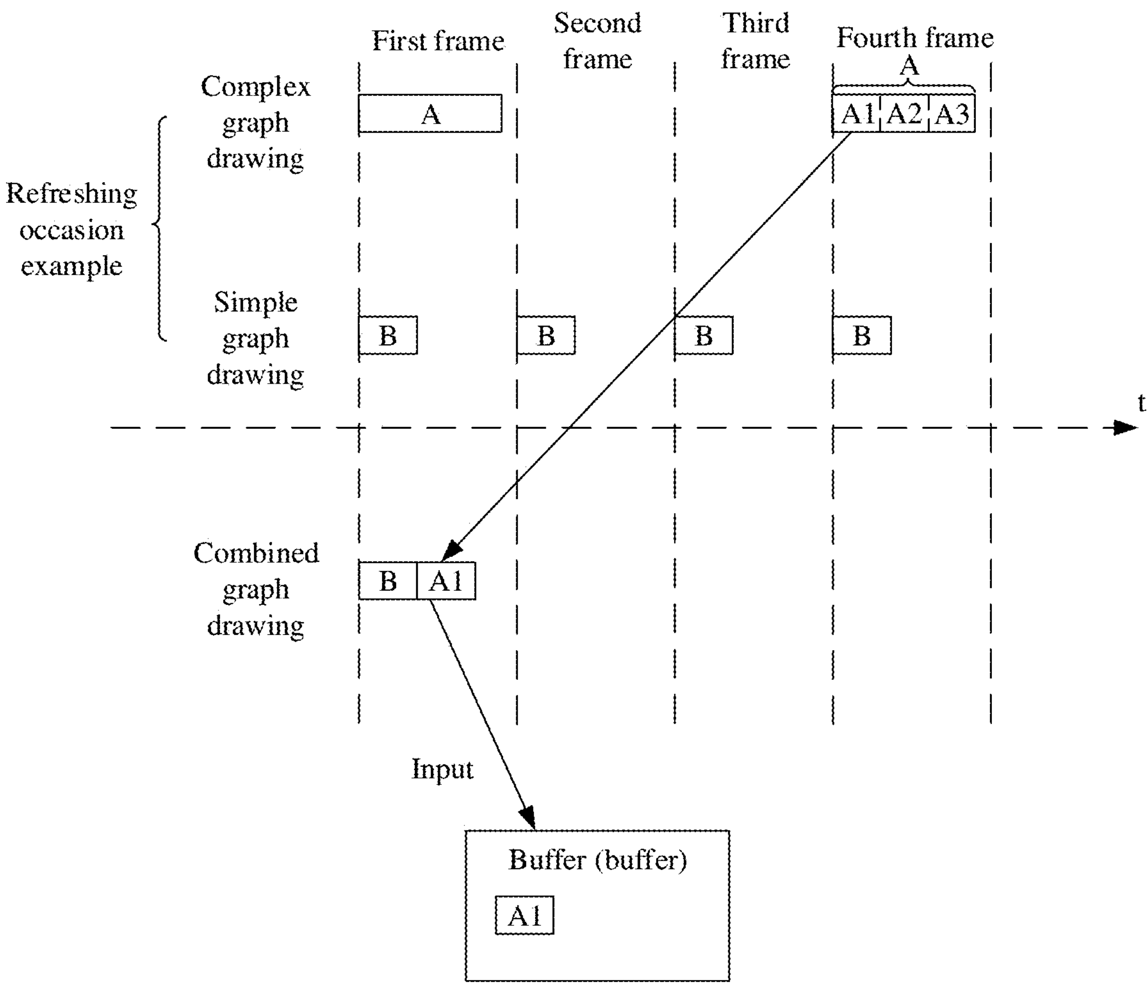
FIG. 6A is a diagram 3 of a graph drawing scenario according to an embodiment of this application.

For example, as shown in FIG. 6A, the component A is refreshed and displayed for one time at an interval of two frames, and the component B is refreshed and displayed for one time every frame. For example, graph data that is of the component A and that is displayed in a second image frame is the same as graph data that is of the component A and that is displayed in a first frame, and graph data that is of a component A and that is displayed in a third image frame is the same as the graph data that is of the component A and that is displayed in the second frame. In this case, the electronic device does not need to redraw the component A in the second frame and the third frame. However, a component A displayed in a fourth image frame is different from those in the first three frames, and needs to be redrawn. For another example, graph data of components B in all frames is different, and each frame of component B needs to be redrawn. In this case, the electronic device needs to simultaneously refresh and display the component A and the component B at an interval of two frames. If component drawing is performed in series according to the conventional technology, a frame loss shown in FIG. 2B may occur in the first frame and the fourth frame.

It should be noted that each component length shown in FIG. 6A indicates component drawing (in other words, drawing and rendering) time, and the first frame, the second frame, the third frame, and the fourth frame correspond to a same frame rate cycle.

In some embodiments, the developer presets, in an application development package, parameter information corresponding to the complex graph, for example, including a drawing parameter and a time parameter. After refreshing, the electronic device may obtain parameter information of a next time of refreshing corresponding to the complex graph, to implement segment drawing. The drawing parameter includes, for example, parameters such as a shape, a layer, a coordinate location, transparency, a color, a size, a scaling-up/down change, text content, a marquee speed, and a text font format of a component that affect display of the component. The time parameter includes, for example, information about a time length from a moment at which the time parameter is obtained to a next time of refreshing, for example, the time length (for example, 16.667 ms) to the next time of refreshing, or a quantity of frames (for example, three frames) to the next time of refreshing.

It should be noted that the electronic device refreshes and displays the image frame based on the screen refresh rate, the next time of refreshing of the component indicates a refreshing occasion at which the component needs to be rendered and displayed again, and parameter information of the next time of refreshing of the component is used to implement rendering and display of the component on the refreshing occasion. For example, in a scenario shown in FIG. 6A, the electronic device refreshes and displays the image frame in each frame based on the screen refresh rate. After the component A and the component B are rendered and displayed in the first frame, a next refreshing occasion of the component A is the fourth frame, and a next refreshing occasion of the component B is the second frame. In other words, the component B needs to be redrawn and rendered in each frame, to refresh and display the component B based on the screen refresh rate. However, a screen needs to be refreshed at a time interval shown in the second frame and the third frame, but the component A does not need to be rendered or displayed again. Therefore, it may be determined that the second frame and the third frame are not refreshing occasions of the component A.

For example, as shown in FIG. 6A, a view system in the electronic device can obtain, in the first frame through an API, parameter information that is of a next time of refreshing of the component A and that is preset in an application development package at an application layer, for example, including a drawing parameter (the rotation angle of the minute hand 11 in the scenario shown in FIG. 1) and a time parameter of the component A that needs to be refreshed and displayed in the fourth frame. Optionally, the developer presets an API used to transmit parameter information of the complex component. After obtaining the parameter information of the component from the API, the view system may determine that the component is a complex component and needs to be drawn by segment. Alternatively, the parameter information of the complex component carries a preset identifier (for example, the preset identifier is added to the drawing parameter and/or the time parameter). After obtaining the parameter information carrying the preset identifier, the view system determines that the component corresponding to the parameter information is a complex component and needs to be drawn by segment. Alternatively, after obtaining the parameter information of the component, the view system determines, based on the time parameter in the parameter information, that time to the next refreshing occasion exceeds a preset threshold, and the corresponding component may be drawn by segment. Alternatively, after obtaining the parameter information of the component, the view system determines, based on the time parameter in the parameter information, that a quantity of time units of an interval between every two times of refreshing of the component is a fixed quantity greater than 0, and a corresponding component may be drawn by segment based on the quantity of time units of the interval.

As shown in FIG. 6A, the view system may determine, based on any one of the foregoing methods, that the component A needs to be drawn by segment. In addition, the view system may determine that a current frame is the first frame, and is separated by three frames from the fourth frame for a next time of refreshing, and the three frames may be used to draw graph data of the component A by segment. Therefore, the view system may divide the graph data of the component A based on a preset rule, to determine graph data that needs to be drawn in each frame. For example, the graph data of the component A is equally divided based on the time parameter, and then in each frame before refreshing, the divided graph data corresponding to the component A (content shown in FIG. 6A to FIG. 6C) is drawn after graph data of another component is drawn. For another example, in a frame before the next time of refreshing of the component A, the view system uses, based on longest drawing time corresponding to a frame rate cycle of the electronic device to draw the component A (for specific content, refer to content shown in FIG. 8), all time remaining after graph data of another component is drawn.

For example, the view system divides the graph data of the component A into three parts, for example, A1, A2, and A3, based on time of the three frame of the first frame, the second frame, and the third frame. Division of the graph data of the component may be determined based on a data structure of the component. As shown in FIG. 6A, the developer determines matrix information of the to-be-displayed component A, and equally divides a matrix corresponding to the component A, where A1, A2, and A3 each correspond to ⅓ of the matrix. It should be noted that a method for dividing the graph data of the component is not specifically limited in this application.

Optionally, in a graph drawing process, the view system preferably draws original to-be-drawn graph data. After drawing of the original to-be-drawn data is completed, it is determined whether a CPU is idle currently. If the CPU is idle currently, the divided graph data may be drawn. The view system may determine, based on whether time consumed for drawing in the current frame exceeds a frame rate cycle limit, whether the CPU is idle. For example, if the view system determines that the time consumed for drawing in the current frame does not exceed the frame rate cycle limit, the view system may determine that the CPU is idle currently.

Figure 6B:
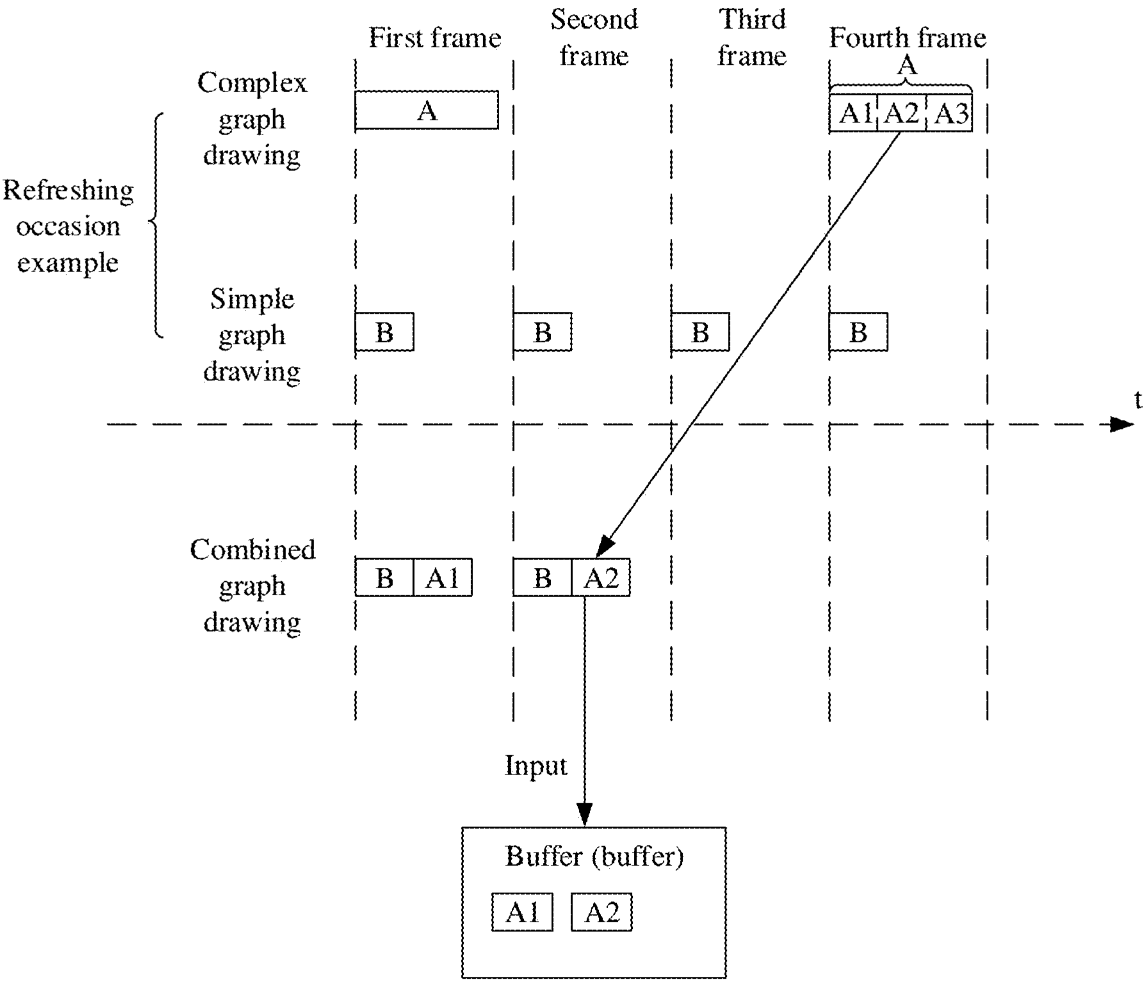
FIG. 6B is a diagram 4 of a graph drawing scenario according to an embodiment of this application.
Figure 6C:
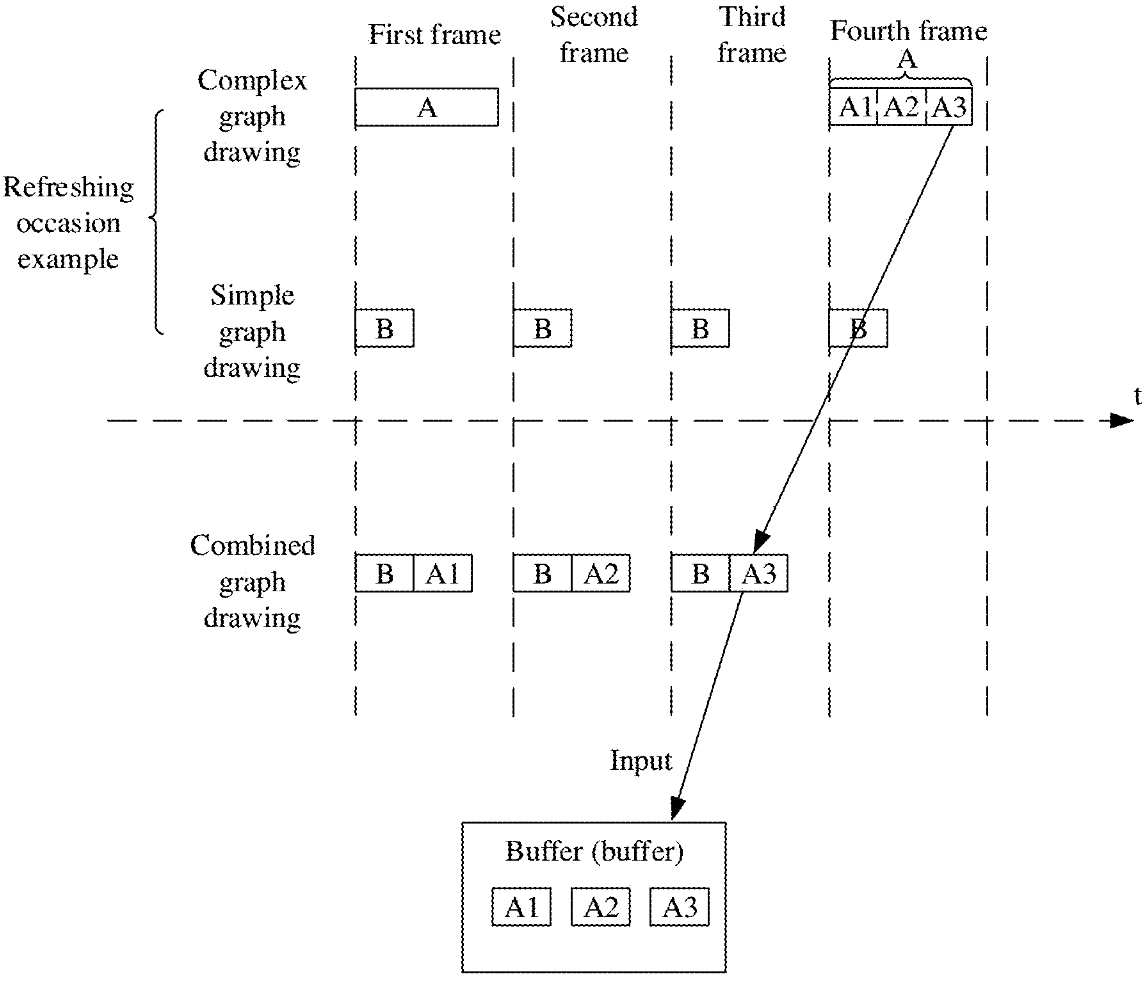
FIG. 6C is a diagram 5 of a graph drawing scenario according to an embodiment of this application.

In this case, as shown in FIG. 6A, the view system completes drawing of the graph data of the component B in the first frame, and then determines to draw A1. After drawing of A1 is completed, A1 is buffered in a buffer (buffer). Similarly, as shown in FIG. 6B, in the second frame, after completing drawing of the graph data of the component B, the view system draws A2, and places drawn A2 in the buffer. As shown in FIG. 6C, in the third frame, after completing drawing of the graph data of the component B, the view system draws A3, and places drawn A3 in the buffer.

Figure 6D:
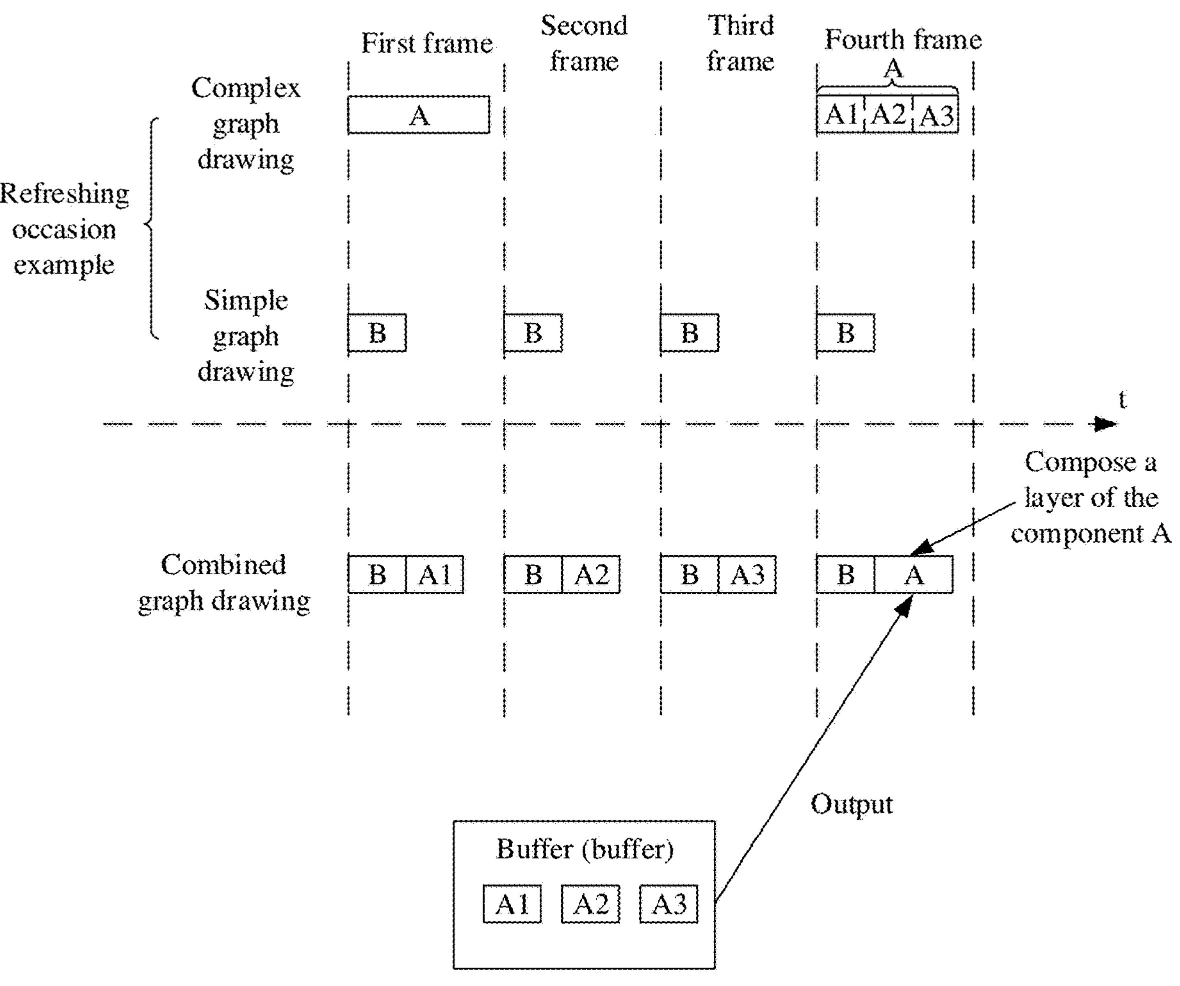
FIG. 6D is a diagram 6 of a graph drawing scenario according to an embodiment of this application.

Then, as shown in FIG. 6D, the view system determines to refresh the component A in the fourth frame. In the fourth frame, the view system obtains buffered A1, A2, and A3 from the buffer, and may directly compose the layer of the component A and perform rendering, to implement refreshing and display in the fourth frame.

Optionally, a buffer configured to store the graph data that is of the component and that is drawn by segment is different from a buffer configured to store other to-be-displayed drawing data. For example, in scenarios shown in FIG. 6A to FIG. 6D, in a process in which the view system draws the component B, corresponding drawn data is stored in a buffer 1. After drawing of the component B is completed, data of the component B may be extracted from the buffer 1 and displayed. The buffer 1 is used as a display buffer, and is configured to store to-be-displayed graph data. After the view system draws the component A by segment, data drawn by segment is stored in a buffer 2 different from the buffer 1. Then, at the refreshing occasion, the view system extracts, from the buffer 2, all data drawn by segment, composes a layer, and stores the layer in the buffer 1, to display the component A. Optionally, the buffer 1 and the buffer 2 may be distinguished by using different values of a flag bit.

It may be understood that, a logical operation needs to be performed in a component drawing process. For example, a display location after the component A is refreshed is calculated. This is time-consuming. Therefore, in a frame in which refreshing does not need to be performed, the view system has completed drawing of the component A. In this case, in a frame in which refreshing is performed, the view system only needs to complete rendering and composition work of the component A that consumes a short period of time. This effectively reduces time consumed for processing the component A in a frame in which refreshing needs to be performed, and avoids a frame loss and frame freezing caused when drawing of all graph data cannot be completed in one frame rate cycle. Therefore, smooth display of the image frame is ensured, and user experience is effectively improved.

In some embodiments, as shown in FIG. 6D, in the fourth frame, the electronic device refreshes the display, and displays a new image frame. In addition, in the fourth frame, the electronic device may further obtain parameter information of a next time of refreshing of the component A (for example, a frame for the next time of refreshing is a seventh frame, and parameter information that is of the component A and that corresponds to the seventh frame is obtained), and the foregoing segment drawing method is repeated, to complete drawing of the component A. Therefore, in a display process of the electronic device, smoothness of the display process can be ensured in the segment drawing method.

Optionally, in the scenarios shown in FIG. 6A to FIG. 6D, after composing the layer of the component A in the fourth frame, the view system may clear the buffer of data corresponding to a component A that is composed currently, so that the buffer can buffer graph data subsequently drawn by segment.

It should be noted that, in the following embodiment, the electronic device may obtain, in a frame in which refreshing is performed, parameter information of a component in a frame for a next time of refreshing. In addition, after refreshing, data corresponding to current refreshing is cleared from the buffer, to ensure that the buffer can meet a subsequent buffering requirement. Details are not described again below.

In some embodiments, as described above, before drawing the divided graph data, the view system needs to first determine whether the CPU is idle and whether a drawing requirement can be met, to avoid a frame loss caused when drawing cannot be completed. In one case, in one or more frames, time remaining after the original to-be-drawn graph data is drawn is insufficient for drawing the divided graph data. In this case, the divided graph data cannot be drawn in these frames, and the view system may delay drawing of the divided graph data that needs to be drawn in these frames, until a subsequent frame in which the CPU is idle, to avoid a frame loss.

Figure 7:
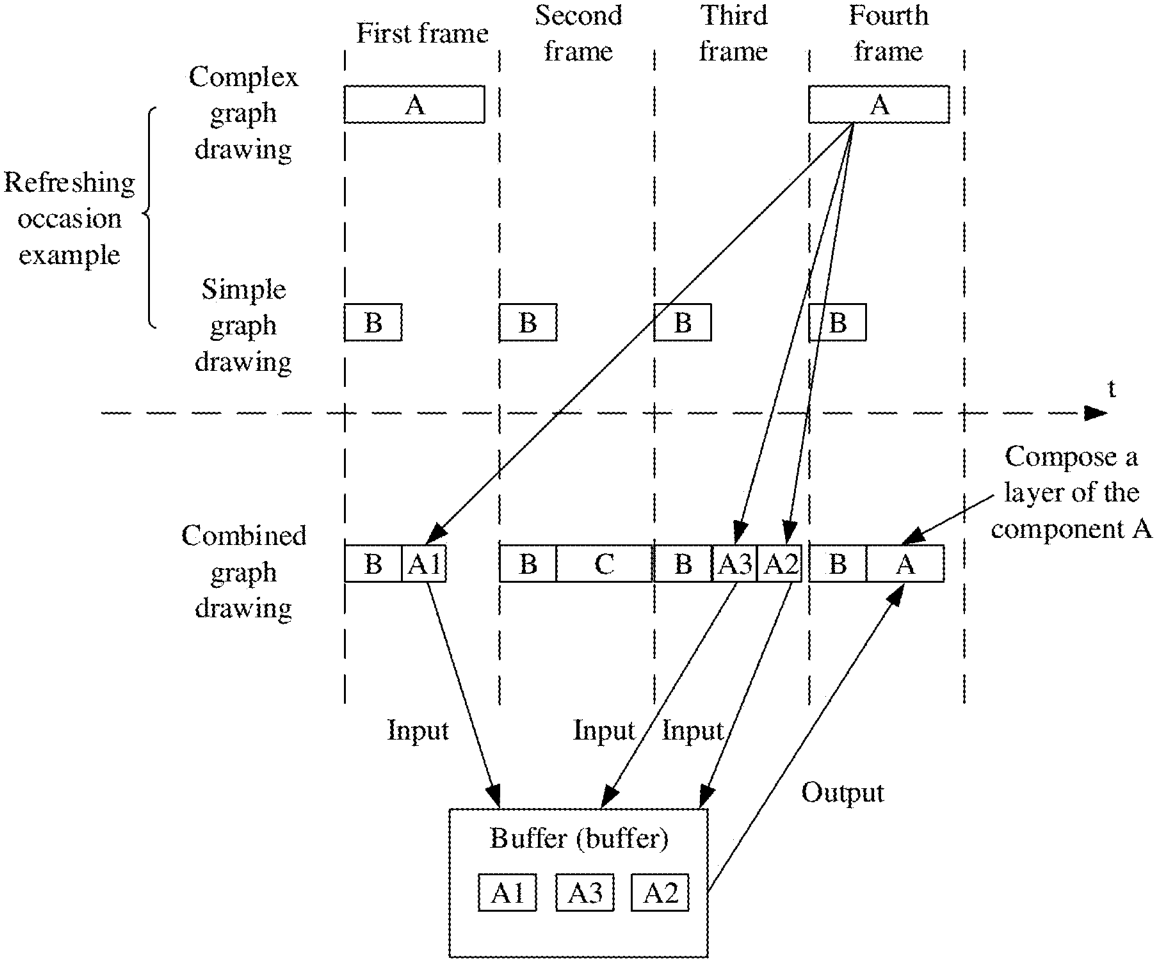
FIG. 7 is a diagram 7 of a graph drawing scenario according to an embodiment of this application.

For example, corresponding to the scenario shown in FIG. 6A, as shown in FIG. 7, the view system equally divides the component A into three parts A1, A2, and A3 based on three frames in which the component A does not need to be refreshed. Original to-be-drawn graph data that needs to be drawn in the second frame includes the graph data of the component B and graph data of a component C. After the view system determines to draw the graph data of the component B and graph data of a component C, the CPU is no longer idle. For example, time consumed for drawing the graph data of the component B and the graph data of the component C is equal to duration of the frame rate cycle, or remaining time is insufficient for drawing A2. In this case, the view system determines to delay drawing of A2. Then, as shown in FIG. 7, after completing drawing of the graph data of the component B and A3 in the third frame, the view system determines whether the CPU is idle. If the CPU is idle, the view system may draw A2 whose drawing is delayed. In this way, in the fourth frame, the view system may also complete composition of the layer of the component A, to implement refreshing and display of the component A. Alternatively, after drawing of the graph data of the component B and A3 is completed in the third frame, if it is determined that the CPU is not idle or the remaining time is insufficient for drawing A2, A2 may be delayed again, and A2 is not drawn until a time period in which the CPU is idle in a frame before a frame in which refreshing is performed or in a frame in which refreshing is performed. For example, A2 is drawn in the fourth frame and a layer of the component A is composed.

In this way, the electronic device adaptively adjusts a frame used to draw the divided graph data, to ensure that an image frame can be normally displayed in a frame in which refreshing is performed, and avoid a frame loss and frame freezing in another frame.

In some embodiments, the view system in the electronic device obtains, through the API, the parameter information (for example, including the drawing parameter and the time parameter) that is of the next time of refreshing of the component A and that is preset in the application development package at the application layer, and may determine a size of the graph data of the component A based on the drawing parameter. To avoid a frame loss, total duration of drawing the graph data in one frame rate cycle needs to be less than or equal to the frame rate cycle. If the screen refresh rate is 60 Hz and the frame rate cycle Tis 16.667 ms, total duration for drawing graph data in each frame in the view system needs to be less than or equal to 16.667 ms. Therefore, the view system may not need to equally divide the graph data of the component A in advance, but may draw the graph data of the component A based on the time parameter, the frame rate cycle, and the longest drawing time.

Figure 8:
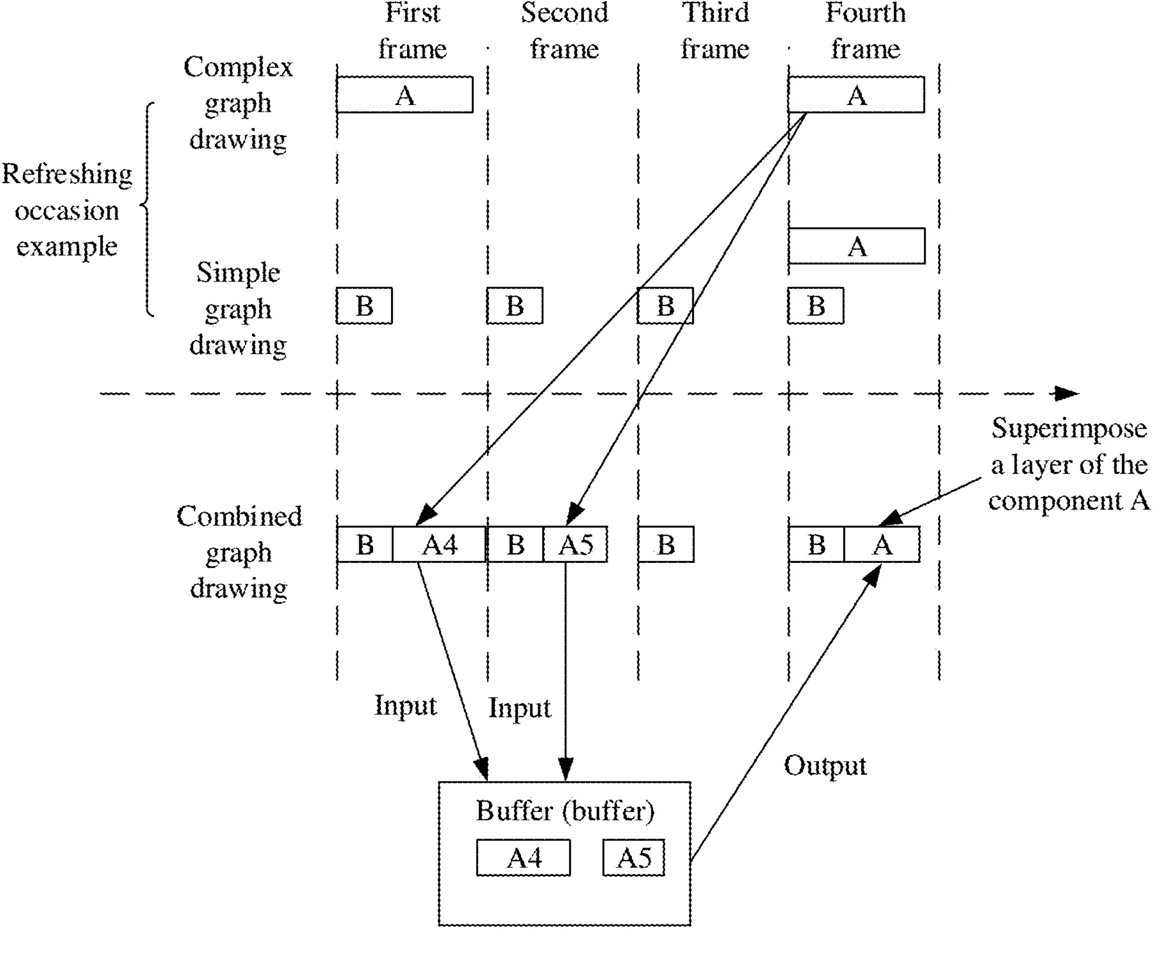
FIG. 8 is a diagram 8 of a graph drawing scenario according to an embodiment of this application.

For example, corresponding to the scenario shown in FIG. 6A, as shown in FIG. 8, the view system determines that the component A is a complex graph, and determines, based on the obtained time parameter of the next time of refreshing of the component A, that the component A may be drawn by segment in the first frame, the second frame, and the third frame. In this case, after completing drawing of the graph data of the component B in the first frame, the view system determines that the CPU is idle, and may determine remaining time of the current frame as time used to draw some graph data in the graph data of the component A. As shown in FIG. 8, the view system determines that graph data with a maximum data amount of A4 is drawn in the remaining time, and may divide A4 from the graph data of the component A, and complete drawing of A4 in the first frame. In other words, duration of the first frame is determined as longest drawing time, and the graph data is drawn in the longest drawing time. In this way, a frame loss is not caused. Alternatively, a longest drawing time threshold is set. The longest drawing time threshold is less than or equal to duration of the frame rate cycle. The view system draws the graph data based on the longest drawing time threshold. Then, as shown in FIG. 8, in the second frame, the view system may still draw graph data based on the longest drawing time threshold. For example, if the view system determines remaining graph data (for example, A5) of the component A, there may be remaining time in the second frame after drawing is completed in the second frame, and the view system may no longer perform graph drawing in the current frame. Then, as shown in FIG. 8, the view system may complete all drawing of the component A in the second frame. In this case, when refreshing is performed in the fourth frame, composition of layers of the component A may be completed, and a drawing process of the component A does not cause a frame loss, to ensure display smoothness of the electronic device.

In some embodiments, after equally dividing graph data of a component based on a time parameter of the component, the view system of the electronic device determines that drawing duration corresponding to each segment of divided to-be-drawn data exceeds the frame rate cycle, and may draw the graph data of the component based on the longest drawing time. Then, the view system draws the remaining to-be-drawn data in a frame corresponding to the refreshing occasion. Alternatively, in the scenario shown in FIG. 7 or FIG. 8, if the view system determines that some to-be-drawn data of the component drawn by segment is still not drawn in the frame corresponding to the refreshing occasion, remaining data may be drawn in the frame, to implement display.

Optionally, a data size threshold is preset. For example, if the view system determines, in the frame corresponding to the refreshing occasion, that segment drawing of the component is not completed for the component, and a size of drawn data is greater than or equal to the preset data size threshold, drawing of remaining to-be-drawn data may be completed in the frame, and then rendering and layer composition are performed, to implement display of the component. Alternatively, if the view system determines, in the frame corresponding to the refreshing occasion, that segment drawing is not completed for the component, but drawn data is less than the preset data size threshold, the view system may redraw the component in the frame, to implement display of the component. Optionally, the preset data size threshold is, for example, a percentage threshold. For example, the preset data size threshold is 80% of a data amount of the component. The view system determines, in the frame corresponding to the refreshing occasion, that 90% of the component is drawn, and may draw remaining 10% of data in the frame. For another example, the preset data size threshold is 80% of a data amount of the component. The view system determines, in the frame corresponding to the refreshing occasion, that only 30% of the component is drawn, and may redraw the component in the frame.

Specifically, data of a component that does not need to be drawn by segment may be directly stored in the buffer 1 for display, and data drawn by segment needs to be stored in the buffer 2, and then stored in the buffer 1 for display. A specific delay exists in this process. Therefore, the preset data size threshold may be determined based on the delay. If it is determined, in a frame in which refreshing is performed, that drawn data is less than the preset data size threshold, a delay generated when a component continues to be drawn in a segment drawing manner is greater than a delay generated when all graph data of the component is directly drawn. Based on this, when determining that the drawn data is less than the preset data size threshold, the view system may redraw the component, to ensure normal display of the component.

In some embodiments, the view system may obtain the parameter information of a preset quantity of refreshing times, to reduce a quantity of times that the view system obtains the parameter information from the application layer through the API. For example, in a scenario in which a pointer of a clock regularly changes in FIG. 1, the developer may preconfigure regular parameter information in an application development package of the clock, for example, rotation angle information of a change of the minute hand 11 every minute. In this way, when requesting the parameter information, the view system may directly obtain all drawing parameters and time parameters of rotating the minute hand 11 for one round within 60 minutes. Then, the view system directly and automatically determines, based on all the drawing parameters and time parameters, a drawing parameter and a time parameter that correspond to a next refreshing occasion, without a need to obtain parameter information of a next time of refreshing of the minute hand 11 from the application layer for each time of refreshing, and may also draw graph data of the minute hand 11.

In this way, according to the drawing method provided in this embodiment of this application, frame freezing caused by a frame loss in a complex interface display process can be avoided through segment drawing, without a need to perform hardware reconstruction for a lightweight device, for example, without increasing a CPU processing speed or expanding a hardware acceleration processing module. This ensures a high frame rate display requirement of a user for a complex interface and improves user experience.

Figure 9:
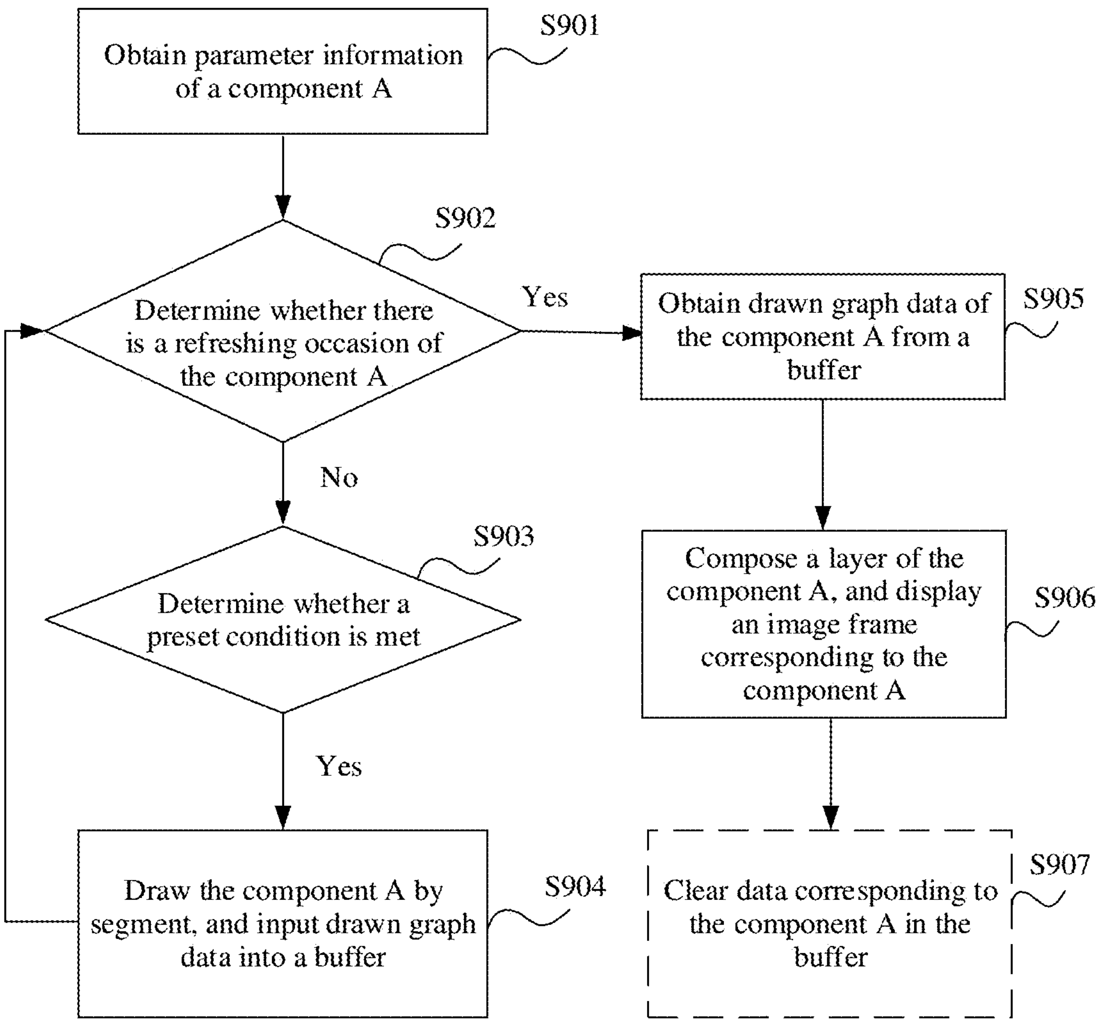
FIG. 9 is a schematic flowchart 1 of a drawing method according to an embodiment of this application.

For example, FIG. 9 is a schematic flowchart of a drawing method according to an embodiment of this application. As shown in FIG. 9, the method includes the following steps.

S901: An electronic device obtains parameter information of a component A.

In some embodiments, if the component A is a complex graph, parameter information of the component A after an image frame is refreshed is preset in an application development package corresponding to the component A. The parameter information includes a drawing parameter and a time parameter.

In some embodiments, after detecting an input event, the electronic device may obtain the parameter information of the component A, and determine that graph data of the component A needs to be drawn by segment. The input event includes, for example, a UI event or an operation (for example, a touch operation on a display) performed by a user to trigger a change of a display picture of the display.

In some embodiments, after obtaining the parameter information of the component A, the electronic device may determine whether the graph data of the component A needs to be drawn by segment, in other words, determine whether the component A is a complex graph. For example, a view system determines, based on a preset identifier carried in the parameter information of the component A or based on the time parameter, that the graph data of the component A needs to be drawn by segment. Then, a segment drawing rule may be further determined. For example, the graph data of the component A is drawn by segment by equally dividing the graph data of the component A, or the graph data of the component A is drawn by segment based on longest drawing time corresponding to a frame rate cycle.

For example, as shown in FIG. 6A, the view system in the electronic device obtains, in a first frame through an API, parameter information that is of a next time of refreshing of the component A and that is preset in an application development package at an application layer, for example, including a drawing parameter and a time parameter of the component A that needs to be refreshed and displayed in a fourth frame. The view system determines, based on the preset identifier carried in the parameter information, that the component A needs to be drawn by segment. In this case, the view system may divide the graph data of the component A based on the drawing parameter, the time parameter, and a preset rule, and determine, in a frame before a next refreshing occasion, to draw the component A by segment. For example, the view system determines that ⅓ of the graph data of the component A needs to be drawn in each of three frames before the fourth frame for a next time of refreshing.

For another example, as shown in FIG. 8, the view system in the electronic device obtains, in a first frame through an API, parameter information that is of a next time of refreshing of the component A and that is preset in an application development package at an application layer, and determines, based on a time parameter in the parameter information, that the component A is refreshed and displayed at an interval of a fixed quantity of time units (for example, two frames). In this case, it may be determined that the component A needs to be drawn by segment based on the longest drawing time in the three frames before the fourth frame for the next time of refreshing of the component A.

S902: The electronic device determines whether there is a refreshing occasion of the component A; and performs step S903 if there is no refreshing occasion of the component A; or performs S905 if there is a refreshing occasion of the component A.

In some embodiments, after obtaining the parameter information of the component A and determining the rule for drawing the component A by segment, the electronic device needs to determine, in a time sequence, whether there is a refreshing occasion of the component A, that is, needs to determine whether the component A needs to be refreshed in a current frame. If the electronic device determines that there is no refreshing occasion of the component A, the electronic device may determine whether the component A may be drawn by segment (that is, perform step S903). If the electronic device determines that there is a refreshing occasion of the component A, the electronic device may determine that the graph data that is of the component A and that is drawn by segment needs to be obtained (that is, perform step S905), to refresh and display the component A.

S903: The electronic device determines whether a preset condition is met; and may perform step S904 if the preset condition is met; or may not draw the component A if the preset condition is not met.

In some embodiments, the preset condition includes, for example, that to-be-drawn graph data of the component A exists, and/or a CPU has an idle time period.

For example, as shown in FIG. 6B, the view system determines that a second frame is not a refreshing occasion of the component A. In step S901, the view system has determined that ⅓ of the graph data of the component A needs to be drawn by segment in the second frame (that is, has determined that to-be-drawn graph data A2 exists), and determines that the CPU is idle in remaining time of the current frame after a component B is drawn. In other words, the view system may perform step S904 when determining that the preset condition is met.

For another example, corresponding to the scenario shown in FIG. 6B, as shown in FIG. 7, the view system determines that a second frame is not a refreshing occasion of the component A. The view system determines that to-be-drawn graph data A2 exists in the second frame. However, after a component B and a component C are drawn in the second frame, remaining time does not meet a requirement of drawing the graph data A2. In other words, the CPU is not idle. In this case, the view system determines that the preset condition is not met, and no longer draws the component A in the second frame.

For another example, as shown in FIG. 8, the view system determines that a third frame is not a refreshing occasion of the component A, and the CPU is idle after the component B is drawn. However, the view system determines that the to-be-drawn graph data of the component A does not exist (in other words, segment drawing of the graph data of the component A is completed in the first frame and the second frame). In this case, the view system determines that the preset condition is not met, and no longer draws the component A in the third frame.

S904: The electronic device draws the component A by segment, and inputs drawn graph data into a buffer.

In some embodiments, if the electronic device determines that there is currently no refreshing occasion of the component A and the preset condition is met, the electronic device may draw the graph data of the component A by segment based on the segment drawing rule in the example in step S901, and input data that is of the component A and that is drawn by segment into the buffer for subsequent use in composing the component A.

For example, as shown in FIG. 6A to FIG. 6C, if the segment drawing rule is to equally divide the to-be-drawn graph data of the component A based on the time parameter, the view system draws, in each of the first frame, the second frame, and the third frame, corresponding ⅓ of the graph data of the component A, and inputs drawn graph data A1, drawn graph data A2, and drawn graph data A3 into the buffer for storing the data drawn by segment.

For another example, as shown in FIG. 8, if the segment drawing rule is to draw the to-be-drawn graph data of the component A based on the longest drawing time corresponding to the frame rate cycle, after drawing of the component B is completed in the first frame, the view system uses, based on the longest drawing time, all remaining time of a current frame rate cycle to draw the component A, for example, obtains drawn graph data A4, and inputs the graph data A4 into the buffer for storing the data drawn by segment. Then, after the component B is drawn in the second frame, remaining graph data of the component A is drawn based on the longest drawing time. For example, drawn graph data A5 is obtained, to complete drawing of the component A. In addition, the graph data A5 is input into the buffer for storing the data drawn by segment.

S905: The electronic device obtains the drawn graph data of the component A from the buffer.

S906: The electronic device composes a layer of the component A, and displays an image frame corresponding to the component A.

In some embodiments, in step S905 and step S906, the electronic device determines that there is currently a refreshing occasion of the component A, for example, determines that the component A needs to be refreshed and displayed in the current frame. In this case, the electronic device may obtain, from the buffer, the graph data that is of the component A and that is drawn by segment, perform rendering, and compose the layer of the component A, to display the refreshed component A in the current frame.

For example, as shown in FIG. 6D, in the fourth frame, the view system obtains, from the buffer, the graph data A1, the graph data A2, and the graph data A3 that are drawn by segment, and composes the three parts of graph data, to implement refreshing and display of the component A.

For another example, as shown in FIG. 8, in the fourth frame, the view system obtains, from the buffer, the graph data A4 and the graph data A5 that are drawn by segment, and composes the two parts of graph data, to implement refreshing and display of the component A.

Optionally, as shown in FIG. 9, a procedure of the method may further include step S907:

S907: The electronic device clears data corresponding to the component A in the buffer.

In some embodiments, when determining that composition of the layer of the component A is completed in the current frame, the electronic device may delete, from the buffer, related data that is of the component A and that is buffered in a previous frame, to ensure that the buffer can meet a buffering requirement of subsequent graph data.

For example, as shown in FIG. 6D or FIG. 8, in the fourth frame, the view system has refreshed and displayed the component A, and may delete the related data that is of the component A and that is buffered in the buffer.

Optionally, for other content of step S901 to step S907, refer to related content shown in FIG. 6A to FIG. 6D, FIG. 7, or FIG. 8. Details are not described herein again.

In this way, according to the drawing method provided in this embodiment of this application, frame freezing caused by a frame loss in a complex interface display process can be avoided through segment drawing, without a need to perform hardware reconstruction for a lightweight device, for example, without increasing a CPU processing speed or expanding a hardware acceleration processing module. This ensures a high frame rate display requirement of a user for a complex interface and improves user experience.

Figure 10:
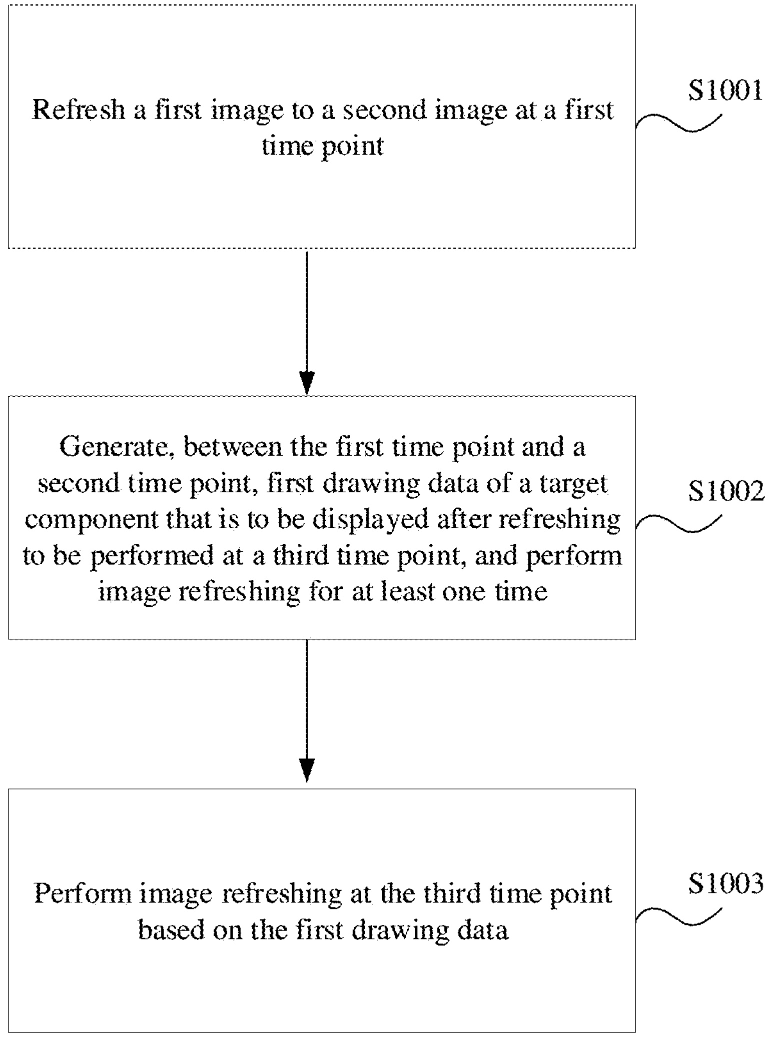
FIG. 10 is a schematic flowchart 2 of a drawing method according to an embodiment of this application.

For example, FIG. 10 is a schematic flowchart of another drawing method according to an embodiment of this application. As shown in FIG. 10, the method includes the following steps.

S1001: An electronic device refreshes a first image to a second image at a first time point.

In some embodiments, a target component in the second image is different from a target component in the first image. In other words, if some graph data (for example, a target component) in an image frame before the first time point is different from some graph data in an image frame after the first time point, and graph data of the target component needs to be drawn.

For example, in scenarios shown in FIG. 6A to FIG. 8, the first time point is a start time point of a first frame.

S1002: The electronic device generates, between the first time point and a second time point, first drawing data of a target component that is to be displayed after refreshing to be performed at a third time point, and performs image refreshing for at least one time.

In some embodiments, a time sequence of the first time point, the second time point, and the third time is that the first time point is before the second time point, and the second time point is before the third time point.

In some embodiments, a target component in an image obtained after each time of refreshing is the same as the target component in the second image. In other words, a target component in an image frame displayed between the first time point and the second time point does not need to be redrawn.

For example, in the scenarios shown in FIG. 6A to FIG. 8, the first time point is the start time point of the first frame, and the second time point may be any one of a start time point of a second frame, a start time point of a third frame, or a start time point of a fourth frame. It may be understood that the electronic device refreshes and displays an image after a start time point of each frame or an end time point of each frame.

In some embodiments, before it is determined to generate, between the first time point and the second time point, the first drawing data of the target component that is to be displayed after refreshing to be performed at the third time point, that the target component that is to be displayed after refreshing to be performed at the third time point is different from the target component in the second image needs to be determined at the first time point. Alternatively, that the target component that is to be displayed after refreshing to be performed at the third time point at a preset time interval is different from the target component in the second image is determined at the first time point. In other words, before segment drawing of the target component is determined, it needs to be determined that the target component is a complex component, and segment drawing is required.

For example, the electronic device obtains parameter information of a target component at the first time point. For example, the parameter information includes a drawing parameter and a time parameter. For example, the electronic device learns, at the first time point based on the time parameter, that a time point for a next time of refreshing is the third time point, and may determine that the target component that is to be displayed after refreshing to be performed at the third time point is different from a target component displayed before refreshing. Therefore, it is determined that the target component needs to be drawn by segment. Alternatively, the electronic device determines, based on the time parameter, that a quantity of time units of an interval between every two times of refreshing of the target component is a fixed quantity greater than 0, and may determine that the target component needs to be drawn by segment, in other words, the target component is drawn by segment based on the quantity of time units of the interval.

In some embodiments, the electronic device determines that a time interval between the first time point and the second time point is a first quantity of frame rate cycles. There is one frame rate cycle between the second time point and the third time point. The electronic device performs image refreshing based on the frame rate cycle; equally divides, based on the first quantity, to-be-drawn data of the target component that is to be displayed after refreshing to be performed at the third time point; and generates the first drawing data between the first time point and the second time point based on a division result.

For example, as shown in FIG. 6A, after determining that the component A needs to be drawn by segment, the electronic device determines that a current frame is the first frame, and is separated by three frames from the fourth frame for a next time of refreshing, and the three frames may be used to draw graph data of the component A by segment. Therefore, the electronic device may divide the graph data of the component A based on a preset rule, to determine graph data that needs to be drawn in each frame. For example, the electronic device divides the graph data of the component A into three parts, for example, A1, A2, and A3, based on time of the three frame of the first frame, a second frame, and a third frame. Division of the graph data of the component may be determined based on a data structure of the component. As shown in FIG. 6A, the developer determines matrix information of the to-be-displayed component A, and equally divides a matrix corresponding to the component A, where A1, A2, and A3 each correspond to ⅓ of the matrix.

In some embodiments, the electronic device may draw a component based on a quantity of parts into which the to-be-drawn data of the component is divided.

For example, the first quantity is N, and N is an integer greater than or equal to 2. 1/N of the to-be-drawn data of the target component that is to be displayed after refreshing to be performed at the third time point is drawn in each refreshing cycle between the first time point and the second time point, and the first drawing data is generated. In addition, the first drawing data is stored in a target storage area.

For example, as shown in FIG. 6A, the electronic device completes drawing of graph data of a component B in the first frame, and then determines to draw A1. After drawing of A1 is completed, A1 is buffered in a buffer (a target storage area). Similarly, as shown in FIG. 6B, in the second frame, after completing drawing of the graph data of the component B, a view system draws A2, and places drawn A2 in the buffer. As shown in FIG. 6C, in the third frame, after completing drawing of the graph data of the component B, the view system draws A3, and places drawn A3 in the buffer. Herein, A1, A2, and A3 each are ⅓ of the component A.

For another example, the to-be-drawn data of the target component that is to be displayed after refreshing to be performed at the third time point is drawn based on the division result in each frame rate cycle in a first frame rate cycle between the first time point and the second time point; the first drawing data is generated; and the to-be-drawn data of the target component that is to be displayed after refreshing to be performed at the third time point is not drawn in a remaining second frame rate cycle. Usage of a CPU in the first frame rate cycle is less than or equal to a first threshold, and usage of the CPU in the second frame rate cycle is greater than the first threshold.

For example, corresponding to the scenario shown in FIG. 6A, as shown in FIG. 7, the electronic device equally divides the component A into three parts A1, A2, and A3 based on three frames in which the component A does not need to be refreshed. Original to-be-drawn graph data that needs to be drawn in the second frame includes the graph data of the component B and graph data of a component C. After the electronic device determines to draw the graph data of the component B and the graph data of the component C, the CPU is no longer idle (in other words, the usage is greater than the first threshold). For example, time consumed for drawing the graph data of the component B and the graph data of the component C is equal to duration of the frame rate cycle, or remaining time is insufficient for drawing A2. In this case, the electronic device determines to delay drawing of A2. Then, as shown in FIG. 7, after completing drawing of the graph data of the component B and A3 in the third frame, the electronic device determines whether the CPU is idle (whether the usage is less than or equal to the first threshold). If the CPU is idle (in other words, the usage is less than or equal to the first threshold), the electronic device may draw A2 whose drawing is delayed. Alternatively, after drawing of the graph data of the component B and A3 is completed in the third frame, if it is determined that the CPU is not idle or the remaining time is insufficient for drawing A2, A2 may be delayed again, and A2 is not drawn until a time period in which the CPU is idle in a frame before a frame in which refreshing is performed or in a frame in which refreshing is performed. For example, A2 is drawn in the fourth frame and a layer of the component A is composed.

In some embodiments, (a+b) frame rate cycles are included between the first time point and the second time point. Herein, a and b are integers. To-be-drawn data of the target component that is to be displayed after refreshing to be performed at the third time point is drawn in a frame rate cycles between the first time point and the second time point; the first drawing data is generated; and to-be-drawn data of the target component that is to be displayed after refreshing to be performed at the third time point is not drawn in b frame rate cycles between the first time point and the second time point. Usage of a CPU in the a frame rate cycles is less than or equal to a first threshold, and usage of the CPU in the b frame rate cycles is greater than the first threshold; or drawing of the to-be-drawn data of the target component that is to be displayed after refreshing to be performed at the third time point is completed in the a frame rate cycles in which the usage of the CPU is less than or equal to the first threshold.

Optionally, in a frame rate cycle other than a last frame rate cycle in the a frame rate cycles in a time sequence, after the first drawing data is generated, the usage of the CPU is greater than or equal to the first threshold.

For example, corresponding to the scenario shown in FIG. 6A, as shown in FIG. 8, the electronic device determines that the component A is a complex graph, and determines, based on the obtained time parameter of the next time of refreshing of the component A, that the component A may be drawn by segment in the first frame, the second frame, and the third frame. In this case, after completing drawing of the graph data of the component B in the first frame, the electronic device determines that the CPU is idle (in other words, the usage is less than or equal to the first threshold), and may determine remaining time of the current frame as time used to draw some graph data in the graph data of the component A. As shown in FIG. 8, the electronic device determines that graph data with a maximum data amount of A4 is drawn in the remaining time, and may divide A4 from the graph data of the component A, and complete drawing of A4 in the first frame. In other words, duration of the first frame is determined as longest drawing time, and the graph data is drawn in the longest drawing time. In this way, a frame loss is not caused. Alternatively, a longest drawing time threshold is set. The longest drawing time threshold is less than or equal to duration of the frame rate cycle. The electronic device draws the graph data based on the longest drawing time threshold. Then, as shown in FIG. 8, in the second frame, the electronic device may still draw graph data based on the longest drawing time threshold. For example, if the electronic device determines remaining graph data (for example, A5) of the component A, there may be remaining time in the second frame after drawing is completed in the second frame, and the electronic device may no longer perform graph drawing in the current frame.

In other words, the electronic device may adaptively adjust, based on the duration of the frame rate cycle and the usage of the CPU, whether to draw the target component in a frame rate cycle between the first time point and the second time point, and a size of the first drawing data for drawing the target component. In this case, if the target component is drawn based on the longest drawing time, all frame rate cycles other than the last frame rate cycle in the a frame rate cycles in the time sequence and that are used for drawing the target component need to meet a requirement of the longest drawing time. In other words, usage of the CPU after drawing is greater than or equal to the first threshold. After the target component is drawn in the last frame rate cycle, the usage of the CPU may be greater than or equal to the first threshold or less than the first threshold.

S1003: The electronic device performs image refreshing at the third time point based on the first drawing data.

In some embodiments, a target component in a third image obtained after refreshing is different from the target component in the second image.

For example, as shown in FIG. 6D, the electronic device determines to refresh the component A in the fourth frame. In the fourth frame, the electronic device obtains the buffered A1, A2, and A3 from the buffer (that is, the target storage area), and may directly compose the layer of the component A and perform rendering, to implement refreshing and display in the fourth frame.

In some embodiments, the first drawing data is all or some drawing data of the target component to be displayed after refreshing to be performed at the third time point.

For example, the first drawing data is some drawing data of the target component to be displayed after refreshing to be performed at the third time point. Remaining second drawing data is generated between the second time point and the third time point if a proportion of the first drawing data to all the drawing data of the target component to be displayed after refreshing to be performed at the third time point is greater than or equal to a second threshold. Alternatively, the first drawing data is discarded if the proportion of the first drawing data to all the drawing data of the target component to be displayed after refreshing to be performed at the third time point is less than the second threshold.

For example, the second threshold is, for example, a percentage threshold. For example, the second threshold is 80% of a data amount of the target component. The electronic device determines, in a frame corresponding to a refreshing occasion, that 90% of the target component is drawn, and may draw remaining 10% of data in the frame. For another example, the second threshold is 80% of a data amount of the target component. The electronic device determines, in a frame corresponding to a refreshing occasion, that only 30% of the target component is drawn, and may redraw the component in the frame. Therefore, display efficiency is improved while it is ensured that the target component is normally displayed.

In this way, according to the drawing method provided in this embodiment of this application, frame freezing caused by a frame loss in a complex interface display process can be avoided through segment drawing, without a need to perform hardware reconstruction for a lightweight device, for example, without increasing a CPU processing speed or expanding a hardware acceleration processing module. This ensures a high frame rate display requirement of a user for a complex interface and improves user experience.

The foregoing describes in detail the drawing methods provided in embodiments of this application with reference to FIG. 6A to FIG. 10. The following describes in detail a drawing apparatus provided in an embodiment of this application with reference to FIG. 11.

Figure 11:
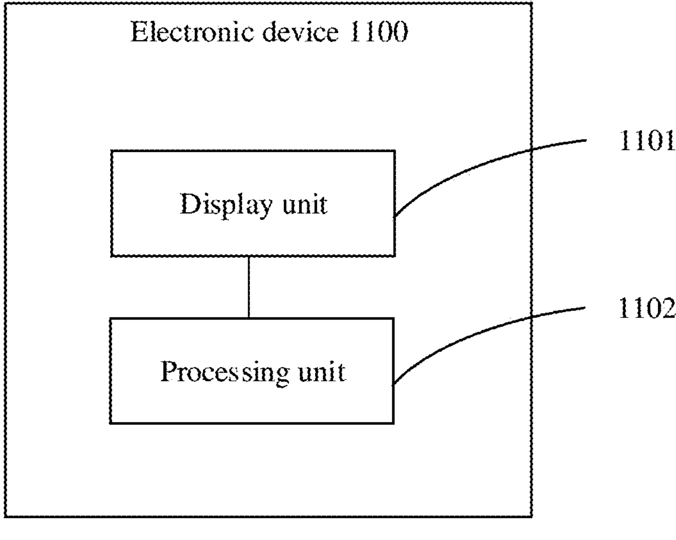
FIG. 11 is a diagram of a structure of an electronic device according to an embodiment of this application.

In a possible design, FIG. 11 is a diagram of a structure of an electronic device according to an embodiment of this application. As shown in FIG. 11, an electronic device 1100 may include a display unit 1101 and a processing unit 1102.

The electronic device 1100 may be configured to implement functions of the electronic device in the method embodiments.

Optionally, the display unit 1101 is configured to: support the electronic device 1100 to display interface content; and/or support the electronic device 1100 to perform S906 in FIG. 9.

Optionally, the processing unit 1102 is configured to support the electronic device 1100 to perform S901 to S905 and S907 in FIG. 9, and/or is configured to support the electronic device 1100 to perform S1001 to S1003 in FIG. 10.

A transceiver unit may include a receiving unit and a sending unit, may be implemented by a transceiver or a transceiver-related circuit component, and may be a transceiver or a transceiver module. Operations and/or functions of the units in the electronic device 1100 are separately used to implement corresponding procedures of the drawing method in the method embodiments. All related content of the steps in the method embodiments may be cited in function descriptions of corresponding functional units. For brevity, details are not described herein again.

Optionally, the electronic device 1100 shown in FIG. 11 may further include a storage unit (not shown in FIG. 11), and the storage unit stores a program or instructions. When the display unit 1101 and the processing unit 1102 execute the program or the instructions, the electronic device 1100 shown in FIG. 11 may perform the drawing method in the method embodiments.

For technical effects of the electronic device 1100 shown in FIG. 11, refer to technical effects of the drawing method in the method embodiments. Details are not described herein again.

In addition to a form of the electronic device 1100, the technical solutions provided in this application may also be a functional unit or a chip in the electronic device, or an apparatus used in combination with the electronic device.

An embodiment of this application further provides a chip system, including a processor. The processor is coupled to a memory, and the memory is configured to store a program or instructions. When the program or the instructions are executed by the processor, the chip system implements the method in any one of the method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may be one or more memories in the chip system. The memory may be integrated with the processor, or may be disposed separately from the processor. This is not limited in this embodiment of this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this embodiment of this application.

For example, the chip system may be a field programmable gate array (field programmable gate array, FPGA), an application-specific integrated circuit (application-specific integrated circuit, ASIC), a system on chip (system on chip, SoC), a central processing unit (central processing unit, CPU), a network processor (network processor, NP), a digital signal processor circuit (digital signal processor, DSP), a micro controller unit (micro controller unit, MCU), a programmable logic device (programmable logic device, PLD), or another integrated chip.

It should be understood that the steps in the method embodiments may be completed by using an integrated logic circuit of hardware in the processor or instructions in a form of software. The steps of the method disclosed with reference to embodiments of this application may be directly performed by a hardware processor, or may be performed through a combination of hardware in the processor and a software module.

An embodiment of this application further provides a computer-readable storage medium. The computer-readable storage medium stores a computer program. When the computer program runs on a computer, the computer is enabled to perform the foregoing related steps, to implement the drawing methods in the foregoing embodiments.

An embodiment of this application further provides a computer program product. When the computer program product is run on a computer, the computer is enabled to perform the related steps, to implement the drawing methods in the foregoing embodiments.

In addition, an embodiment of this application further provides an apparatus. The apparatus may be specifically a component or a module, and the apparatus may include one or more processors and a memory that are connected to each other. The memory may be configured to store a computer program. When the computer program is executed by the one or more processors, the apparatus is enabled to perform the drawing method in the method embodiments.

The apparatus, the computer-readable storage medium, the computer program product, or the chip provided in embodiments of this application are all configured to perform the corresponding method provided above. Therefore, for beneficial effects that can be achieved, refer to beneficial effects in the corresponding method provided above, and details are not described herein again.

Methods or algorithm steps described in combination with the content disclosed in embodiments of this application may be implemented by hardware, or may be implemented by a processor by executing software instructions. The software instructions may include a corresponding software module, and the software module may be stored in a random access memory (random access memory, RAM), a flash memory, a read-only memory (read-only memory, ROM), an erasable programmable read-only memory (erasable programmable ROM, EPROM), an electrically erasable programmable read-only memory (electrically EPROM, EEPROM), a register, a hard disk, a removable hard disk, a compact disc read-only memory (CD-ROM), or any other form of storage medium well known in the art. For example, a storage medium is coupled to a processor, so that the processor can read information from the storage medium and write the information into the storage medium. Certainly, the storage medium may alternatively be a component of the processor. The processor and the storage medium may be located in an application-specific integrated circuit (application-specific integrated circuit, ASIC).

Based on the descriptions of the implementations, a person skilled in the art may clearly understand that for the purpose of convenient and brief descriptions, division into the functional modules is merely used as an example for description. In actual application, the foregoing functions can be allocated to different functional modules and implemented based on a requirement, in other words, an inner structure of an apparatus is divided into different functional modules to implement all or some of the functions described above. For a specific working process of the system, apparatus, and unit, refer to a corresponding process in the method embodiments. Details are not described herein again.

In the several embodiments provided in this application, it should be understood that the disclosed methods may be implemented in other manners. For example, the described apparatus embodiment is merely an example. For example, division into the modules or units is merely logical functional division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the modules or units may be implemented in electronic, mechanical, or other forms.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

The computer-readable storage medium includes but is not limited to any one of the following: any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, applied to an electronic device, the method comprising:

refreshing a first image to a second image at a first time point, wherein a target component in the second image is different from a target component in the first image;

generating, between the first time point and a second time point, first drawing data of a target component that is to be displayed after refreshing to be performed at a third time point, and performing image refreshing for at least one time between the first time point and the second time point, wherein a target component in an image obtained after each time of refreshing performed between the first time point and the second time point is the same as the target component in the second image; and performing image refreshing at the third time point based on the first drawing data, wherein the target component in a third image obtained after the refreshing at the third time point is different from the target component in the second image, and image refreshing between the second time point and third time point is not based on the first drawing data.

2. The method according to claim 1, further comprising:

before generating, between the first time point and the second time point, the first drawing data of the target component that is to be displayed after the refreshing to be performed at the third time point:

determining, at the first time point, that the target component that is to be displayed after the refreshing to be performed at the third time point is different from the target component in the second image; or determining, at the first time point, that the target component that is to be displayed after the refreshing to be performed at the third time point at a preset time interval is different from the target component in the second image.

3. The method according to claim 1, wherein generating, between the first time point and the second time point, the first drawing data of the target component that is to be displayed after the refreshing to be performed at the third time point comprises:

determining that a time interval between the first time point and the second time point is a first quantity of frame rate cycles, wherein there is one frame rate cycle between the second time point and the third time point, and performing, by the electronic device, the at least one time of refreshing between the first time point and the second time point based on the first quantity of frame rate cycles;

equally dividing, based on the first quantity, to-be-drawn data of the target component that is to be displayed after the refreshing to be performed at the third time point, to obtain a division result; and generating the first drawing data between the first time point and the second time point based on the division result.

4. The method according to claim 3, wherein the first quantity is N, and N is an integer greater than or equal to 2; and wherein generating the first drawing data between the first time point and the second time point based on the division result comprises:

drawing, in each refreshing cycle between the first time point and the second time point, 1/N of the to-be-drawn data of the target component that is to be displayed after the refreshing to be performed at the third time point, and generating the first drawing data.

5. The method according to claim 3, wherein generating the first drawing data between the first time point and the second time point based on the division result comprises:

drawing, based on the division result, in each frame rate cycle in a plurality of first frame rate cycles between the first time point and the second time point, the to-be-drawn data of the target component that is to be displayed after the refreshing to be performed at the third time point;

generating the first drawing data; and skipping drawing, in a remaining second frame rate cycle, second to-be-drawn data of the target component that is to be displayed after the refreshing to be performed at the third time point, wherein usage of a central processing unit (CPU) in the plurality of first frame rate cycles is less than or equal to a first threshold, and usage of the CPU in the second frame rate cycle is greater than the first threshold.

6. The method according to claim 1, wherein (A+B) frame rate cycles are comprised between the first time point and the second time point, A and B are integers, and wherein generating, between the first time point and the second time point, the first drawing data of the target component that is to be displayed after the refreshing to be performed at the third time point comprises:

drawing, in A frame rate cycles between the first time point and the second time point, to-be-drawn data of the target component that is to be displayed after the refreshing to be performed at the third time point;

generating the first drawing data; and skipping drawing, in B frame rate cycles between the first time point and the second time point, second to-be-drawn data of the target component that is to be displayed after the refreshing to be performed at the third time point, and wherein:

usage of a central processing unit (CPU) in the A frame rate cycles is less than or equal to a first threshold, and usage of the CPU in the B frame rate cycles is greater than the first threshold; or drawing of the to-be-drawn data of the target component that is to be displayed after refreshing to be performed at the third time point is completed in the A frame rate cycles in which the usage of the CPU is less than or equal to the first threshold.

7. The method according to claim 6, wherein in a frame rate cycle other than a last frame rate cycle in the A frame rate cycles in a time sequence, after the first drawing data is generated, the usage of the CPU is greater than or equal to the first threshold.

8. The method according to claim 6, wherein the first drawing data is all or some drawing data of the target component to be displayed after the refreshing to be performed at the third time point.

9. The method according to claim 8, wherein the first drawing data is some drawing data of the target component to be displayed after the refreshing to be performed at the third time point, and the method further comprises:

generating remaining second drawing data between the second time point and the third time point when a proportion of the first drawing data to all the drawing data of the target component to be displayed after the refreshing to be performed at the third time point is greater than or equal to a second threshold; or discarding the first drawing data when the proportion of the first drawing data to all the drawing data of the target component to be displayed after refreshing to be performed at the third time point is less than the second threshold.

10. The method according to claim 1, wherein after generating, between the first time point and the second time point, the first drawing data of the target component that is to be displayed after the refreshing to be performed at the third time point, the method further comprises:

storing the first drawing data in a target storage area.

11. An electronic device, comprising:

at least one processor; and at least one memory coupled to the at least one processor and storing programming instructions that, when executed by the at least one processor, cause the electronic device to perform operations comprising:

refreshing a first image to a second image at a first time point, wherein a target component in the second image is different from a target component in the first image;

generating, between the first time point and a second time point, first drawing data of a target component that is to be displayed after refreshing to be performed at a third time point, and performing image refreshing for at least one time between the first time point and the second time point, wherein a target component in an image obtained after each time of refreshing performed between the first time point and the second time point is the same as the target component in the second image; and performing image refreshing at the third time point based on the first drawing data, wherein the target component in a third image obtained after the refreshing at the third time point is different from the target component in the second image, and image refreshing between the second time point and third time point is not based on the first drawing data.

12. The electronic device according to claim 11, wherein the programming instructions, when executed by the at least one processor, cause the electronic device to perform operations further comprising:

before generating, between the first time point and the second time point, the first drawing data of the target component that is to be displayed after the refreshing to be performed at the third time point:

determining, at the first time point, that the target component that is to be displayed after the refreshing to be performed at the third time point is different from the target component in the second image; or determining, at the first time point, that the target component that is to be displayed after the refreshing to be performed at the third time point at a preset time interval is different from the target component in the second image.

13. The electronic device according to claim 11, wherein generating, between the first time point and the second time point, the first drawing data of the target component that is to be displayed after the refreshing to be performed at the third time point comprises:

determining that a time interval between the first time point and the second time point is a first quantity of frame rate cycles, wherein there is one frame rate cycle between the second time point and the third time point, and performing, by the electronic device, the at least one time of refreshing between the first time point and the second time point based on the first quantity of frame rate cycles;

equally dividing, based on the first quantity, to-be-drawn data of the target component that is to be displayed after refreshing to be performed at the third time point, to obtain a division result; and generating the first drawing data between the first time point and the second time point based on the division result.

14. The electronic device according to claim 13, wherein the first quantity is N, and N is an integer greater than or equal to 2; and wherein generating the first drawing data between the first time point and the second time point based on the division result comprises:

drawing, in each refreshing cycle between the first time point and the second time point, 1/N of the to-be-drawn data of the target component that is to be displayed after the refreshing to be performed at the third time point, and generating the first drawing data.

15. The electronic device according to claim 13, wherein generating the first drawing data between the first time point and the second time point based on the division result comprises:

drawing, based on the division result in each frame rate cycle in a plurality of first frame rate cycles between the first time point and the second time point, the to-bedrawn data of the target component that is to be displayed after the refreshing to be performed at the third time point;

generating the first drawing data; and skipping drawing, in a remaining second frame rate cycle, second to-be-drawn data of the target component that is to be displayed after the refreshing to be performed at the third time point, wherein usage of a central processing unit (CPU) in the plurality of first frame rate cycles is less than or equal to a first threshold, and usage of the CPU in the second frame rate cycle is greater than the first threshold.

16. The electronic device according to claim 13, wherein (A+B) frame rate cycles are comprised between the first time point and the second time point, A and B are integers, and generating, between the first time point and the second time point, the first drawing data of the target component that is to be displayed after the refreshing to be performed at the third time point comprises:

drawing, in A frame rate cycles between the first time point and the second time point, the to-be-drawn data of the target component that is to be displayed after the refreshing to be performed at the third time point;

generating the first drawing data; and skipping drawing, in B frame rate cycles between the first time point and the second time point, second to-be-drawn data of the target component that is to be displayed after the refreshing to be performed at the third time point, and wherein:

usage of a central processing unit (CPU) in the A frame rate cycles is less than or equal to a first threshold, and usage of the CPU in the B frame rate cycles is greater than the first threshold; or drawing of the to-be-drawn data of the target component that is to be displayed after the refreshing to be performed at the third time point is completed in the A frame rate cycles in which the usage of the CPU is less than or equal to the first threshold.

17. The electronic device according to claim 16, wherein in a frame rate cycle other than a last frame rate cycle in the A frame rate cycles in a time sequence, after the first drawing data is generated, the usage of the CPU is greater than or equal to the first threshold.

18. The electronic device according to claim 11, wherein the first drawing data is all or some drawing data of the target component to be displayed after the refreshing to be performed at the third time point.

19. The electronic device according to claim 11, wherein the programming instructions, when executed by the at least one processor, cause the electronic device to perform operations further comprising:

after generating, between the first time point and the second time point, the first drawing data of the target component that is to be displayed after the refreshing to be performed at the third time point, storing the first drawing data in a target storage area.

20. A non-transitory computer readable medium configured to store instructions that, when executed by at least one processor of an electronic device, cause the electronic device to perform operations comprising:

refreshing a first image to a second image at a first time point, wherein a target component in the second image is different from a target component in the first image;

generating, between the first time point and a second time point, first drawing data of a target component that is to be displayed after refreshing to be performed at a third time point, and performing image refreshing for at least one time between the first time point and the second time point, wherein a target component in an image obtained after each time of refreshing performed between the first time point and the second time point is the same as the target component in the second image; and performing image refreshing at the third time point based on the first drawing data, wherein the target component in a third image obtained after the refreshing at the third time point is different from the target component in the second image, and image refreshing between the second time point and third time point is not based on the first drawing data.

* * * * *